US012812476B2

(12) United States Patent
Barac et al.

(10) Patent No.: US 12,812,476 B2
(45) Date of Patent: Nov. 24, 2026

(54) ENHANCED XN HANDOVER MESSAGES FOR IAB INTER-CU MIGRATION

(71) Applicant: Telefonaktiebolaget LM Ericsson (publ), Stockholm (SE)

(72) Inventors: Filip Barac, Huddinge (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 781 days.

(21) Appl. No.: 18/010,115

(22) PCT Filed: Jun. 16, 2021

(86) PCT No.: PCT/SE2021/050591
§ 371 (c)(1),
(2) Date: Dec. 13, 2022

(87) PCT Pub. No.: WO2021/256983
PCT Pub. Date: Dec. 23, 2021

(65) Prior Publication Data

US 2023/0239754 A1 Jul. 27, 2023

Related U.S. Application Data

(60) Provisional application No. 63/040,555, filed on Jun. 18, 2020, provisional application No. 63/040,553, filed on Jun. 18, 2020.

(51) Int. Cl.
*H04W 36/00* (2009.01)
*H04W 36/06* (2009.01)

(52) U.S. Cl.
CPC ... *H04W 36/0009* (2018.08); *H04W 36/0088* (2013.01); *H04W 36/06* (2013.01)

(58) Field of Classification Search
CPC ......... H04W 36/0009; H04W 36/0088; H04W 36/06; H04W 28/0862; H04W 92/20
See application file for complete search history.

(56) References Cited

U.S. PATENT DOCUMENTS

2014/0206361 A1* 7/2014 Centonza ........ H04W 36/00695 455/444
2021/0076404 A1 3/2021 Tzu-jane et al.
(Continued)

FOREIGN PATENT DOCUMENTS

CN 110536350 A 12/2019
CN 111093286 A 5/2020
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.
(Continued)

*Primary Examiner* — Khoa Huynh
(74) *Attorney, Agent, or Firm* — Murphy, Bilak & Homiller, PLLC

(57) ABSTRACT

Embodiments herein relate to, for example, a method performed by a first radio network node (12) for handling communication in a wireless communications network. The first radio network node receives from a second radio network node (15), an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node (15). The first radio network node further
(Continued)

determines to cancel handover or cell reselection of a subset of the one or more other nodes based the received indication.

16 Claims, 22 Drawing Sheets

(56) References Cited

U.S. PATENT DOCUMENTS

| | | | | |
|---|---|---|---|---|
| 2021/0227435 | A1* | 7/2021 | Hsieh | H04W 36/087 |
| 2022/0322464 | A1 | 10/2022 | Luo et al. | |
| 2022/0369190 | A1* | 11/2022 | Diao | H04W 36/12 |

FOREIGN PATENT DOCUMENTS

| | | | |
|---|---|---|---|
| WO | 2019246446 | A1 | 12/2019 |
| WO | 2020032127 | A1 | 2/2020 |
| WO | 2020066605 | A1 | 4/2020 |
| WO | 2020067736 | A1 | 4/2020 |

OTHER PUBLICATIONS

3GPP , "3rd Generation Partnership Project; Technical Specification Group Radio Access Network; NG-RAN; Architecture description (Release 16)", 3GPP TS 38.401 V16.1.0, Mar. 2020, 1-50.

3GPP , "3rd Generation Partnership Project; Technical Specification Group Radio Access Network; NG-RAN; XN application protocol (XnAP) (Release 16)", 3GPP TS 38.423 V16.1.0, Mar. 2020, 1-334.

3GPP , "3rd Generation Partnership Project; Technical Specification Group Radio Access Network; NR; NR and NG-RAN Overall Description; Stage 2 (Release 16)", 3GPP TS 38.300 V16.1.0, Mar. 2020, 1-133.

3GPP , "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

3GPP , "3rd Generation Partnership Project; Technical Specification Group Radio Access Network; NR; Study on Integrated Access and Backhaul; (Release 16)", 3GPP TR 38.874 V16.0.0, Dec. 2018, 1-111.

3GPP , "3rd Generation Partnership Project; Technical Specification Group Radio Access Network; Study on Integrated Access and Backhaul; (Release 15)", 3GPP TR 38.874 0.7.0, Nov. 2018, 1-111.

CATT , "(TP for NR_IAB BL CR for TS 38.401) Inter-CU IAB-node migration", 3GPP TSG-RAN WG3 #106, R3-196959, Reno, NV, USA, Nov. 18-22, 2019, 1-6.

Ericsson , "(TP for NR_IAB BL CR for TS 38.423): Corrections to BL CR", 3GPP TSG-RAN WG3 Meeting #108-e, R3-203816, Online, Jun. 1-11, 2020, 1-14.

Huawei , "Basic principles for IAB topology adaptation", 3GPP TSG-RAN WG2 #103, R2-1812833, Gothenburg, Sweden, Aug. 20-Aug. 24, 2018, 1-4.

Kyocera , "Consideration of topology adaptation in IAB", 3GPP TSG-RAN WG2 #103, R2-1811843, Gothenburg, Sweden, Aug. 20-24, 2018, 1-5.

Qualcomm , "New WID on Enhancements to Integrated Access and Backhaul", 3GPP TSG RAN Meeting #86, RP-193251, (revision of RP-193145), Sitges, Spain, Dec. 9-12, 2019, 1-5.

Unknown, Author , "ETSI TS 138 322 V16.1.0", 5G;NR; Radio Link Control (RLC) protocol specification (3GPP TS 38.322 version 16.1.0 Release 16), Jul. 2020, 1-36.

ZTE , et al., "Discussion on network-controlled IAB migration handling", 3GPP TSG RAN WG3 Meeting #104, R3-192519, Reno, USA, May 13-17, 2019, 1-5.

* cited by examiner

ENHANCED XN HANDOVER MESSAGES FOR IAB INTER-CU MIGRATION

TECHNICAL FIELD

Embodiments herein relate to a first radio network node, a second radio network node, and methods performed therein regarding wireless communication. Furthermore, a computer program product and a computer-readable storage medium are also provided herein. In particular, embodiments herein relate to handling communication, such as controlling/managing handover and cell reselection of relay nodes, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as for 5G networks such as New Radio (NR) and upcoming generations. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially “flat” architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Next generation systems are expected to support a wide range of use cases with varying requirements ranging from fully mobile devices to stationary internet of things (IoT) or fixed wireless broadband devices. The traffic pattern associated with many use cases may be expected to consist of short or long bursts of data traffic with varying length of waiting period in between, here called inactive state. In NR, both license-assisted access and standalone unlicensed operation are to be supported. Hence the procedure of Physical Random Access Channel (PRACH) transmission and/or Scheduling Request (SR) transmission in unlicensed spectrum may be investigated in 3GPP.

3GPP is studying potential solutions for efficient operation of integrated access and wireless access backhaul (IAB) in NR, or just integrated access backhaul for short. In the context of IAB there are two kinds of nodes that are identified as components of a RAN:

IAB-node: RAN node that supports wireless access to UEs and wirelessly backhauls the access traffic.

IAB-donor: An IAB node i.e. RAN node which provides UE’s interface to core network and wireless backhauling functionality to IAB nodes. 3GPP is currently standardizing integrated access and wireless access backhaul in NR (IAB) in Rel-16 (RP-193251).

The usage of short range mmWave spectrum in NR creates a need for densified deployment with multi-hop backhauling. However, optical fiber to every base station will be too costly and sometimes not even possible, due to e.g. historical sites. The main IAB principle is the use of wireless links for the backhaul (instead of fiber) to enable flexible and very dense deployment of cells without the need for densifying the transport network.

Use case scenarios for IAB may include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and multiple input multiple output (MIMO) support in NR reduce cross-link interference between backhaul and access links allowing higher densification.

During the study item phase of the IAB work (summary of the study item can be found in the technical report TR 38.874), it has been agreed to adopt a solution that leverages the Central Unit (CU)/Distributed Unit (DU) split architecture of NR, where the IAB node will be hosting a DU part that is controlled by a central unit. The IAB nodes also have a Mobile Termination (MT) part, denoted as IAB-MT, that they use to communicate with their parent nodes.

The specifications for IAB strives to reuse existing functions and interfaces defined in NR. In particular, MT, gNB-DU, gNB-CU, user plane function (UPF), access and mobility management function (AMF) and session management function (SMF) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a high-level architectural shows a high-level architectural view of an IAB network. FIG. 1 shows a reference diagram for IAB in standalone mode, which contains one IAB-donor and multiple IAB-nodes. The IAB-donor may be treated as a single logical node that comprises a set of functions such as gNB-DU, gNB-CU-control plane (CP), gNB-CU-user plane (UP) and potentially other functions. In a deployment, the IAB-donor may be split according to these functions, which may all be either collocated or non-collocated as allowed by 3GPP NG-RAN architecture. IAB-related aspects may arise when such split is exercised. Also, some of the functions presently associated with the IAB-donor may eventually be moved outside of the IAB-donor in case it becomes evident that they do not perform IAB-specific tasks. Thus, FIG. 1 shows a reference diagram for IAB-architectures (TR 38.874 v0.7.0).

The baseline user plane and control plane protocol stacks for IAB are shown in the FIGS. 2-3.

FIG. 2 shows a baseline UP protocol stack for IAB in rel-16.

FIG. 3 shows a baseline CP protocol stack for IAB in rel-16.

As shown, the chosen protocol stacks reuse the current CU-DU split specification in rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both UP and CP traffic (IPsec in the case of UP, and datagram transport layer security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul radio link control (RLC) channel, and also between ingress and egress backhaul RLC channels in intermediate IAB nodes, to satisfy the end-to-end quality of service (QoS) requirements of bearers.

BAP Entities

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows one example of the functional view of the BAP sublayer. This functional view should not restrict implementation. The FIG. 4 is based on the radio interface protocol architecture defined in TS 38.300 v16.1.0. In the example of FIG. 4, the receiving part on the BAP entity delivers BAP Protocol data units (PDU) to the transmitting part on the collocated BAP entity. Alternatively, the receiving part may deliver BAP service data units (SDU) to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation.

Services provided to upper layers.

The following services are provided by the BAP sublayer to upper layers:

- data transfer;

Services expected from lower layers.

A BAP sublayer expects the following services from lower layers per RLC entity (for a detailed description see TS 38.322 v16.1.0):

- acknowledged data transfer service;
- unacknowledged data transfer service.

Functions.

The BAP sublayer supports the following functions:

- Data transfer;
- Determination of BAP destination and path for packets from upper layers;
- Determination of egress backhaul (BH) RLC channels for packets routed to next hop;
- Routing of packets to next hop;
- Differentiating traffic to be delivered to upper layers from traffic to be delivered to egress link;
- Flow control feedback and polling signalling;

Topology Adaptation Scenarios for Baseline Architecture.

FIG. 5A shows an example of some possible IAB-node migration cases listed in the order of complexity and more details as follow:

Intra-CU Case (A): In this case the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, since the new IAB-donor DU, i.e. DU2, is connected to the same L2 network, the IAB-node (e) can use the same IP address under the new donor DU. However, the new donor DU, i.e. DU2, will need to inform the network using IAB-node (e) L2 address in order to get/keep the same IP address for IAB-node (e) by employing some mechanism such as Address Resolution Protocol (ARP).

Intra-CU Case (C): This case is more complex than Case (A) as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and security gateway (SeGW), and new IP address for the IPsec tunnel between SeGW and IAB-node (e) DU.

Inter-CU Case (D): This is the most complicated case in terms of procedural requirements and may need new specification procedures that are beyond the scope of 3GPP Rel-16.

Note that 3GPP Rel-16 has standardized procedure only for intra-CU migration, which is described below.

Thus, FIG. 5A shows examples of different possible scenarios for IAB-node migration.

Intra-CU Topology Adaptation Procedure.

During the intra-CU topology adaptation, both the source and the target parent node are served by the same IAB-donor-CU. The target parent node may use a different IAB-donor-DU than the source parent node. The source path may further have common nodes with the target path. FIG. 5B shows an example of the topology adaptation procedure, where the target parent node uses a different IAB-donor-DU than the source parent node.

FIG. 6 shows an IAB intra-CU topology adaptation procedure.

Action 1. The migrating IAB-MT sends a Measurement Report message to the source parent node gNB-DU. This report is based on a Measurement Configuration the migrating IAB-MT received from the IAB-donor-CU before.

Action 2. The source parent node gNB-DU sends an UL RRC MESSAGE TRANSFER message to the IAB-donor-CU to convey the received Measurement Report.

Action 3. The IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic.

Action 4. The target parent node gNB-DU responds to the IAB-donor-CU with a UE CONTEXT SETUP RESPONSE message.

Action 5. The IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

Action 6. The source parent node gNB-DU forwards the received RRCReconfiguration message to the migrating IAB-MT.

Action 7. The source parent node gNB-DU responds to the IAB-donor-CU with the UE CONTEXT MODIFICATION RESPONSE message.

Action 8. A Random Access procedure is performed at the target parent node gNB-DU.

Action 9. The migrating IAB-MT responds to the target parent node gNB-DU with an RRCReconfigurationComplete message.

Action 10. The target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These DL and UL packets belong to the MT's own signalling and data traffic.

Action 11. The IAB-donor-CU configures BH RLC channels and BAP-layer route entries on the target path between migrating IAB-node and target IAB-donor-DU. This step also includes allocation of transport network layer (TNL) address(es) that is (are) routable via the target IAB-donor-DU. These configurations may be performed at an earlier stage, e.g. right after action 3. The new TNL address(es) is (are) included in the RRCReconfiguration message at action 5.

Action 12. All F1-U tunnels and F1-C are switched to use the migrating IAB-node's new TNL address(es).

Action 13. The IAB-donor-CU sends a UE CONTEXT RELEASE COMMAND message to the source parent node gNB-DU.

Action 14. The source parent node gNB-DU releases the migrating IAB-MT's context and responds the IAB-donor-CU with a UE CONTEXT RELEASE COMPLETE message.

Action 15. The IAB-donor-CU releases BH RLC channels and BAP routing entries on the source path. The migrating IAB-node may further release the TNL address(es) it used on the source path.

NOTE: In case that the source route and target route have common nodes, the BH RLC channels and BAP routing entries of those nodes may not need to be released in action 15.

NOTE: Actions 11, 12 and 15 also have to be performed for the migrating IAB-node's descendant nodes, as follows:

- The descendant nodes must also switch to new TNL addresses that are anchored in the target IAB-donor-DU. The IAB-donor-CU may send these addresses to the descendant nodes and release the old addresses via corresponding radio resource control (RRC) signalling.
- If needed, the IAB-donor-CU configures BH RLC channels, BAP-layer route entries on the target path for the descendant nodes and the BH RLC Channel mappings on the descendant nodes in the same manner as described for the migrating IAB-node in action 11.
- The descendant nodes switch their F1-U and F1-C tunnels to new TNL addresses that are anchored at the new IAB-donor-DU, in the same manner as described for the migrating IAB-node in action 12.
- Based on implementation, these actions can be performed after or in parallel with the handover of the migrating IAB-node. In Rel-16, in-flight packets in UL direction that were dropped during the migration procedure may not be recoverable.

NOTE: In upstream direction, in-flight packets between the source parent node and the IAB-donor-CU can be delivered even after the target path is established.

NOTE: On-going downlink data in the source path may be discarded up to implementation.

NOTE: IAB-donor-CU can determine the unsuccessfully transmitted downlink data over the backhaul link by implementation.

Procedures in CU/DU Split Architecture:

The following sub sections are taken from TS 38.401 v.16.1.0, describing the procedures between the CU and DU, as well as the CU-CP and CU-UP, in case the CU is split into a UP and CP functions.

8.9.2 Bearer Context Setup Over F1-U

FIG. 6A shows the procedure used to setup the bearer context in the gNB-CU-UP, thus, bearer context setup over F1-U.

0. Bearer context setup, e.g., following an SGNB ADDITION REQUEST message from the master (M) eNB, is triggered in gNB-CU-CP.
1. The gNB-CU-CP sends a BEARER CONTEXT SETUP REQUEST message containing UL TNL address information for S1-U or NG-U, and if required, DL TNL address information for X2-U or Xn-U to setup the bearer context in the gNB-CU-UP. For NG-RAN, the gNB-CU-CP decides flow-to-DRB mapping and sends the generated SDAP and Packet Data Convergence Protocol (PDCP) configuration to the gNB-CU-UP.
2. The gNB-CU-UP responds with a BEARER CONTEXT SETUP RESPONSE message containing the UL TNL address information for F1-U, and DL TNL address information for S1-U or NG-U, and if required, UL TNL address information for X2-U or Xn-U.

NOTE: The indirect data transmission for split bearer through the gNB-CU-UP is not precluded.

3. F1 UE context setup procedure is performed to setup one or more bearers in the gNB-DU.
4. The gNB-CU-CP sends a BEARER CONTEXT MODIFICATION REQUEST message containing the DL TNL address information for F1-U and PDCP status.
5. The gNB-CU-UP responds with a BEARER CONTEXT MODIFICATION RESPONSE message.

8.9.3 Bearer Context Release Over F1-U 8.9.3.1 gNB-CU-CP Initiated Bearer Context Release FIG. 6B shows the procedure used to release the bearer context in the gNB-CU-UP initiated by the gNB-CU-CP, thus showing, bearer context release over F1-U—gNB-CU-CP initiated 0. Bearer context release, e.g., following an SGNB RELEASE REQUEST message from the MeNB, is triggered in gNB-CU-CP.
1. The gNB-CU-CP sends a BEARER CONTEXT MODIFICATION REQUEST message to the gNB-CU-UP.
2. The gNB-CU-UP responds with a BEARER CONTEXT MODIFICATION RESPONSE carrying the PDCP UL/DL status.
3. F1 UE context modification procedure is performed to stop the data transmission for the UE. It is up to gNB-DU implementation when to stop the UE scheduling.

NOTE: step 1-3 are performed only if the PDCP status of the bearer(s) needs to be preserved e.g., for bearer type change.

4. The gNB-CU-CP may receive the UE CONTEXT RELEASE message from the MeNB in EN-DC operation as described in Section 8.4.2.1.
5. and 7. Bearer context release procedure is performed.
6. F1 UE context release procedure is performed to release the UE context in the gNB-DU.

8.9.3.2 gNB-CU-UP Initiated Bearer Context Release

FIG. 6C shows the procedure used to release the bearer context in the gNB-CU-UP initiated by the gNB-CU-UP. Thus, showing bearer context release over F1-U—gNB-CU-UP initiated.

0. Bearer context release is triggered in gNB-CU-UP e.g., due to local failure.
1. The gNB-CU-UP sends a BEARER CONTEXT RELEASE REQUEST message to request the release of the bearer context in the gNB-CU-UP. This message may contain the PDCP status.
2.-5. If the PDCP status needs to be preserved, the E1 Bearer Context Modification and the F1 UE Context Modification procedures are performed. The E1 Bearer Context Modification procedure is used to convey data forwarding information to the gNB-CU-UP. The gNB-CU-CP may receive the UE Context Release from the MeNB.
6. The gNB-CU-CP sends a BEARER CONTEXT RELEASE COMMAND message to release the bearer context in the gNB-CU-UP.
7. The gNB-CU-UP responds with a BEARER CONTEXT RELEASE COMPLETE to confirm the release of the bearer context including also data forwarding information.
8. F1 UE context release procedure may be performed to release the UE context in the gNB-DU.

8.9.4 Inter-gNB Handover Involving gNB-CU-UP Change

FIG. 6D shows the procedure used for inter-gNB handover involving gNB-CU-UP change. Overall inter-gNB handover procedure is specified in TS 37.340 [12]. Thus, showing Inter-gNB handover involving gNB-CU-UP change.

1. The source gNB-CU-CP sends HANDOVER REQUEST message to the target gNB-CU-CP.

2-4. Bearer context setup procedure is performed as described in Section 8.9.2.

5. The target gNB-CU-CP responds the source gNB-CU-CP with an HANDOVER REQUEST ACKNOWLEDGE message.

6. The F1 UE Context Modification procedure is performed to stop UL data transmission at the gNB-DU and to send the handover command to the UE.

7-8. Bearer context modification procedure (gNB-CU-CP initiated) is performed to enable the gNB-CU-CP to retrieve the PDCP UL/DL status and to exchange data forwarding information for the bearer.

9. The source gNB-CU-CP sends an SN STATUS TRANSFER message to the target gNB-CU-CP.

10-11. Bearer context modification procedure is performed as described in Section 8.9.2.

12. Data Forwarding may be performed from the source gNB-CU-UP to the target gNB-CU-UP.

13-15. Path Switch procedure is performed to update the DL TNL address information for the NG-U towards the core network.

16. The target gNB-CU-CP sends an UE CONTEXT RELEASE message to the source gNB-CU-CP.

17. and 19. Bearer context release procedure is performed.

18. F1 UE context release procedure is performed to release the UE context in the source gNB-DU.

8.9.5 Change of gNB-CU-UP

FIG. 6E shows the procedure used for the change of gNB-CU-UP within a gNB. Thus, showing Change of gNB-CU-UP.

1. Change of gNB-CU-UP is triggered in gNB-CU-CP based on e.g., measurement report from the UE.

2-3. Bearer Context Setup procedure is performed as described in Section 8.9.2.

4. F1 UE Context Modification procedure is performed to change the UL TNL address information for F1-U for one or more bearers in the gNB-DU.

5-6. Bearer Context Modification procedure (gNB-CU-CP initiated) is performed to enable the gNB-CU-CP to retrieve the PDCP UL/DL status and to exchange data forwarding information for the bearer.

7-8. Bearer Context Modification procedure is performed as described in Section 8.9.2.

9. Data Forwarding may be performed from the source gNB-CU-UP to the target gNB-CU-UP.

10-12. Path Switch procedure is performed to update the DL TNL address information for the NG-U towards the core network.

13-14. Bearer Context Release procedure (gNB-CU-CP initiated) is performed as described in Section 8.9.3.

Xn Procedures for Mobility:

The following section are taken from 38.423 v.16.1.0, showing the core messages/procedures and information elements that are used for mobility of UEs (these messages were referred in the signaling diagrams of section 2.1.3)

9.1.1.1 Handover Request

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target Cell Global ID | M | | 9.2.3.25 | Includes either an E-UTRA CGI or an NR CGI | YES | reject |
| GUAMI | M | | 9.2.3.24 | | YES | reject |
| UE Context Information | | 1 | | | YES | reject |
| >NG-C UE associated Signalling reference | M | | AMF UE NGAP ID 9.2.3.26 | Allocated at the AMF on the source NG-C connection. | — | |
| >Signalling TNL association address at source NG-C side | M | | CP Transport Layer Information 9.2.3.31 | This IE indicates the AMF's IP address of the SCTP association used at the source NG-C interface instance. Note: If no UE TNLA binding exists at the source NG-RAN node, the source NG-RAN node indicates the TNL association address it would have selected if it would have had to create a UE TNLA binding. | — | |
| >UE Security Capabilities | M | | 9.2.3.49 | | — | |
| >AS Security Information | M | | 9.2.3.50 | | — | |
| >lndex to RAT/Freguency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping | — | |
| >RRC Context | M | | OCTET STRING | Either includes the HandoverPreparation Information message as defined in subclause 10.2.2. of TS 36.331 [14], if the target NG-RAN node is an ng-eNB, or the HandoverPreparation Information message as defined in subclause 11.2.2 of TS 38.331 [10], if the target NG-RAN node is a gNB. | | |
| >Location Reporting Information | O | | 9.2.3.47 | Includes the necessary parameters for location reporting. | — | |
| >Mobility Restriction List | O | | 9.2.3.53 | | — | |

-continued

| IE/Group Name | Presence | Range | IE type and reference | Semantics description | Criticality | Assigned Criticality |
|---|---|---|---|---|---|---|
| Trace Activation | O | | 9.2.3.55 | | YES | ignore |
| Masked IMEISV | O | | 9.2.3.32 | | YES | ignore |
| UE History Information | M | | 9.2.3.64 | | YES | ignore |
| UE Context Reference at the S-NG-RAN node | O | | | | YES | ignore |
| >Global NG-RAN Node ID | M | | 9.2.2.3 | | — | |
| >S-NG-RAN node UE XnAP ID | M | | NG-RAN node UE XnAP ID 9.2.3.16 | | — | |

9.1.1.2 Handover Request Acknowledge

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Target NG-RAN node UE XnAP ID | M | | NG-RAN node UE XnAP ID 9.2.3.16 | Allocated at the target NG-RAN node | YES | ignore |
| PDU Session Resources Admitted List | M | | 9.2.1.2 | | YES | ignore |
| PDU Session Resources Not Admitted List | O | | 9.2.1.3 | | YES | ignore |
| Target NG-RAN node To Source NG-RAN node Transparent Container | M | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. | YES | ignore |
| UE Context Kept Indicator | O | | 9.2.3.68 | | YES | ignore |
| Criticality Diagnostics | O | | 9.2.3.3 | | YES | ignore |
| DRBs transferred to MN | O | | DRB List 9.2.1.29 | In case of DC, indicates that SN Status is needed for the listed DRBs from the S-NG-RAN node. | YES | ignore |

9.1.1.3 Handover Preparation Failure

This message is sent by the target NG-RAN node to inform the source NG-RAN node that the Handover Preparation has failed.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Cause | M | | 9.2.3.2 | | YES | ignore |
| Criticality Diagnostics | O | | 9.2.3.3 | | YES | ignore |

9.1.1.6 Handover Cancel

This message is sent by the source NG-RAN node to the target NG-RAN node to cancel an ongoing handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated at the source NG-RAN node. | YES | reject |
| Target NG-RAN node UE XnAP ID | O | | NG-RAN node UE XnAP ID 9.2.3.16 | Allocated at the target NG-RAN node. | YES | ignore |
| Cause | M | | 9.2.3.2 | | YES | ignore |

9.1.1 PDU Session Resources to be Setup List

This IE contains PDU session resource related information used at UE context transfer between NG-RAN nodes.

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item | | 1 . . . <maxnoof PDU sessions> | | | — | |
| >>PDU Session ID | M | | 9.2.3.18 | | — | |
| >>S-NSSAI | M | | 9.2.3.21 | | — | |
| >>PDU Session Resource Aggregate Maximum Bitrate | O | | PDU Session Aggregate Maximum Bit Rate 9.2.3.69 | This IE shall be present when at least one Non-GBR QoS Flow has been setup. | | |
| >>UL NG-U UP TNL Information at UPF | M | | UP Transport Layer Information 9.2.3.30 | UPF endpoint of the NG-U transport bearer. For delivery of UL PDUs | — | |
| >>Additional UL NG-U UP TNL Information at UPF List | O | | Additional UP Transport Layer Information 9.2.1.32 | Additional UPF endpoint of the NG-U transport bearer. For delivery of UL PDUs | YES | ignore |
| >>Source DL NG-U TNL Information | O | | UP Transport Layer Information 9.2.3.30 | Indicates the possibility to keep the NG-U GTP-U tunnel termination point at the target NG-RAN node. | | |
| >> Security Indication | O | | 9.2.3.52 | | — | |
| >>PDU Session Type | M | | 9.2.3.19 | | — | |
| >>Network Instance | O | | 9.2.3.85 | This IE is ignored if the Common Network Instance IE is present. | | |

-continued

| IE/Group Name | Presence | Range | IE type and reference | Semantics description | Criticality | Assigned Criticality |
|---|---|---|---|---|---|---|
| >>QoS Flows To Be Setup List | | 1 | | | — | |
| >>>QoS Flows To Be Setup Item | | 1 . . . <maxnoofQoS Flows> | | | — | |
| >>>>>QoS Flow Identifier | M | | 9.2.3.10 | | — | |
| >>>>QoS Flow Level QoS Parameters | M | | 9.2.3.5 | | — | |
| >>>>E-RAB ID | O | | INTEGER (0 . . . 15, . . . ) | | — | |
| >>Data Forwarding and Offloading Info from source NG-RAN node | O | | 9.2.1.17 | | | |
| >>Common Network Instance | O | | 9.2.3.92 | | YES | ignore |

| Range bound | Explanation |
|---|---|
| maxnoofPDUSessions | Maximum no. of PDU sessions. Value is 256 |
| maxnoofQoSFlows | Maximum no. of QoS flows allowed within one PDU session. Value is 64. |

9.2.1.2 PDU Session Resources Admitted List

This IE contains PDU session resource related information to report success of the establishment of PDU session resources.

| IE/Group Name | Presence | Range | IE type and reference | Semantics description | Criticality | Assigned Criticality |
|---|---|---|---|---|---|---|
| PDU Session Resources Admitted List | | 1 | | | — | |
| >PDU Session Resources Admitted Item | | 1 . . . <maxno ofPDU Sessions> | | | — | |
| >>PDU Session ID | M | | 9.2.3.18 | | — | |
| >>PDU Session Resource Admitted Info | M | | | | — | |
| >>>DL NG-U TNL Information Unchanged | O | | ENUMERATED (True, . . . ) | Indicates the NG-U tunnels that have been kept unchanged at the target NG-RAN node | | |
| >>>QoS Flows Admitted List | | 1 | | | — | |
| >>>>QoS Flows Admitted Item | | 1 . . . <maxno ofQoS Flows> | | | — | |
| >>>>>QoS Flow Identifier | M | | 9.2.3.10 | | — | |
| >>>QoS Flows not Admitted List | O | | QoS Flow List with Cause 9.2.1.4 | | — | |
| >>>Data Forwarding Info from target NG-RAN node | O | | 9.2.1.16 | | — | |

-continued

| IE/Group Name | Presence | Range | IE type and reference | Semantics description | Criticality | Assigned Criticality |
|---|---|---|---|---|---|---|
| >>> Secondary Data Forwarding Info from target NG-RAN node List | O | | 9.2.1.31 | This IE would be present only when the target M-NG-RAN node decide to split a PDU session between MN and SN | YES | ignore |

| Range bound | Explanation |
|---|---|
| maxnoofPDUSessions | Maximum no. of PDU sessions. Value is 256 |
| maxnoofQoSFlows | Maximum no. of QoS flows allowed within one PDU session. Value is 64. |

9.2.1.3 PDU Session Resources not Admitted List

This IE contains a list of PDU session resources which were not admitted to be added or modified.

| IE/Group Name | Presence | Range | IE type and reference | Semantics description |
|---|---|---|---|---|
| PDU Session Resources Not Admitted List | | 1 | | |
| >PDU Session Resources Not Admitted Item | | 1 . . . <max noofPDU Sessions> | | |
| >>PDU Session ID | M | | 9.2.3.18 | |
| >>Cause | O | | 9.2.3.2 | |

| Range bound | Explanation |
|---|---|
| maxnoofPDUSessions | Maximum no. of PDU sessions. Value is 256 |

9.2.3.10 QoS Flow Identifier

This IE identifies a QoS Flow within a PDU Session. Definition and use of the QoS Flow Identifier is specified in TS 23.501 [7].

| IE/Group Name | Presence | Range | IE type and reference | Semantics description |
|---|---|---|---|---|
| QoS Flow Identifier | M | | INTEGER (0 . . . 63, . . . ) | |

As mentioned above, 3GPP Rel-16 has only standardized the IAB intra-CU migration procedure. Considering that inter-CU migration will be an important feature of IAB Rel-17 work item (WI), certain enhancements to existing UE handover and IAB intra-CU migration procedure are required for reducing service interruption (due to IAB-node migration) and signaling load.

SUMMARY

In the legacy UE case, by accepting a handover for an individual UE, the target RAN node commits to providing the resources for serving the migrating UE's signaling connection and up to 16 data radio bearers (DRB). As opposed to a legacy DU which serves a number of UEs, an IAB node may serve not only UEs, but also up to 1024 directly connected child nodes, and up to 65536 BH RLC channels established to each child, and their connected UEs. Moreover, these child IAB nodes may have their own child IAB nodes that also serve UEs. However, current specifications enable only the handover of individual UEs.

Mechanisms shown on how the information and/or contexts of the migrating IAB node and of all the UEs and IAB nodes that are directly or indirectly served by the migrating IAB node are transferred to the target CU are provided, which target-CU uses the received information to perform proper admission control. The target CU-CP will respond to the HANDOVER REQUEST with a HANDOVER REQUEST ACK that will indicate the list of admitted and non-admitted PDU session and BH RLC channel resources, for each concerned UE/IAB node included in the handover request. The PDU session is essentially a set of the QoS flows that were associated with each UE/IAB-MT.

In a multi-hop scenario, it is quite possible that there could be several hops under the migrating IAB node and as such a considerable number of UEs/IAB nodes could be affected by the handover. As such, it is reasonable to assume that not all the PDU sessions/QoS flows of all the concerned UEs and IAB nodes will be admitted at the target.

Currently, the 3GPP standard allows the source node to cancel the handover if it is not satisfied with the level of admission that is indicated by the target, for example, what percentage of the aggregated bit rate of the UE bearers can be fulfilled at the target. However, directly applying the concept of legacy handover cancelation, which is essentially designed for handing over a single UE, to the case of IAB handover, which is basically a group handover, is sub-optimal because the source has to decide to accept or cancel the handover of all the involved UEs/IAB nodes at once. Thus, the source node may have to try to handover several candidate nodes before finding a proper target node, that will lead to handover delay as well as CP signaling overload. Moreover, the IAB group handover via legacy signaling would incur a significant signaling load, since it would be required to execute the handover procedure for each migrating IAB node and UE individually.

An object herein is to provide a mechanism to enable communication, e.g. handle or manage, handover or cell reselection, in an efficient manner in a wireless communications network.

According to an aspect the object is achieved, according to embodiments herein, by providing a method performed by a first radio network node for handling or managing signalling or communication in a wireless communications network. The first radio network node receives from a second radio network node, an indication indicating whether handover or cell reselection to the second radio network node is confirmed or not, and wherein the indication indicates whether a migrating node and/or one or more other nodes, directly and indirectly served by the migrating node, are accepted or cancelled for handover or cell reselection to the second radio network node. The first radio network node then determines to cancel handover or cell reselection of a subset of the one or more other nodes based the received indication. The first radio network node may receive, for example, an indication indicating whether handover is confirmed or not from the second radio network node. The indication may indicate, e.g., one or more nodes accepted or cancelled for handover to the second radio network node. The first radio network node may then determine to cancel handover or cell reselection of one or more nodes, i.e. the subset, out of a plurality of nodes in a message related to handover or cell reselection based on received indication, and further on e.g. architecture of nodes (how they are related) and/or signalling measurements associated with the nodes.

According to another aspect the object is achieved, according to embodiments herein, by providing a method performed by a second radio network node, such as an IAB node, for handling or managing communication and/or control signalling in a wireless communications network. The second radio network node transmits to a first radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node. Hence, the second radio network node may transmit an indication to the first radio network node wherein the indication indicates acceptance or not of handover or cell selection for one or more nodes. The second radio network node may further receive a (second) message including indications such as identities of a subset of nodes such as UEs and IAB nodes, i.e. the one or more nodes out of a plurality of nodes associated with a message for setting up communication of a node, and the other message may further indicate that the handover of the indicated one or more nodes out of the plurality of nodes should be cancelled.

According to yet another aspect of embodiments herein, the object is achieved by providing a first radio network node for handling or managing signalling or communication in a wireless communications network. The first radio network node is configured to receive from a second radio network node, an indication indicating whether handover or cell reselection to the second radio network node is confirmed or not, and wherein the indication indicates whether a migrating node and/or one or more other nodes, directly and indirectly served by the migrating node, are accepted or cancelled for handover or cell reselection to the second radio network node. The first radio network node is configured to then determine to cancel handover or cell reselection of a subset of the one or more other nodes based the received indication. Thus, the first radio network node may be configured to receive an indication indicating whether handover is confirmed or not from the second radio network node. The indication may indicate e.g. one or more nodes accepted or cancelled for handover to the second radio network node. The first radio network node may further be configured to determine to cancel handover or cell reselection of one or more nodes out of a plurality of nodes in a message related to handover or cell reselection based on the indication and further based on e.g. architecture of nodes (how they are related) and/or signalling measurements associated with the nodes.

According to still another aspect the object is achieved, according to embodiments herein, by providing a second radio network node, such as an IAB node, for handling or managing communication and/or control signalling in a wireless communications network. The second radio network node is configured to transmit to a first radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node. Hence, the second radio network node may be configured to transmit an indication to the first radio network node wherein the indication indicates acceptance or not of handover or cell selection for one or more nodes. The second radio network node may further be configured to receive a second message including indications such as identities of a subset of nodes such as UEs and IAB nodes, i.e. the one or more nodes out of a plurality of nodes associated with a message for setting up communication of a node, and the second message further indicates that the handover of the indicated one or more nodes out of the plurality of nodes should be cancelled.

It is furthermore provided herein a computer program product comprising instructions, which, when executed on at least one processor, cause the at least one processor to carry out the method above, as performed by the first radio network node or the second radio network node, respectively. It is additionally provided herein a computer-readable storage medium, having stored thereon a computer program product comprising instructions which, when executed on at least one processor, cause the at least one processor to carry out the method according to the method above, as performed by the first radio network node or the second radio network node, respectively.

Embodiments herein enable the exchange of handover-related information for a migrating node, such as an IAB node, and its directly and indirectly served IAB nodes and UEs and may also convey to the target node, i.e., the second radio network node the information about the parent-child relations therein. In e.g. case the migration/handover of a stationary IAB node is done due to load balancing, it is likely that the one or more other nodes, for example, UEs or children IAB nodes, connected to the IAB node prior to the migration will still be best served by the same IAB node after the migration. Even in the case of mobile IAB, e.g. an IAB node attached to a bus/train, there could be several UEs attached to that IAB node and they will continue to be served by the same IAB node/cell after the migration. Thus, it makes sense to optimize this transition and avoid unnecessary service interruption. In other words, it may be optimal to keep the same topology (of UEs and children IAB nodes) under the migrating IAB node after the handover/migration of the IAB node for a subset of the one or more other nodes.

It is herein proposed a mechanism to selectively cancel the handover for a subset of one or more other nodes such as one or more UEs and/or IAB nodes, directly or indirectly served by the same migrating IAB node. Embodiments herein enable to selectively cancel the handover of a subset of UEs/IAB nodes, thereby making it possible to relocate only the UEs/IAB nodes that will get the desired level of performance at the second radio network nodes, while, for example, finding alternate radio network nodes for those whose handover is cancelled. This will lead to reduced handover time and control plane signaling, leading to optimal performance of the subset of one or more other nodes and the wireless communications network. Thus, embodiments herein enable communication, e.g. handle or manage, handover or cell reselection, in an efficient manner in the wireless communications network.

BRIEF DESCRIPTION OF THE DRAWINGS

Embodiments will now be described in more detail in relation to the enclosed drawings, in which.

DETAILED DESCRIPTION

Figure 1:
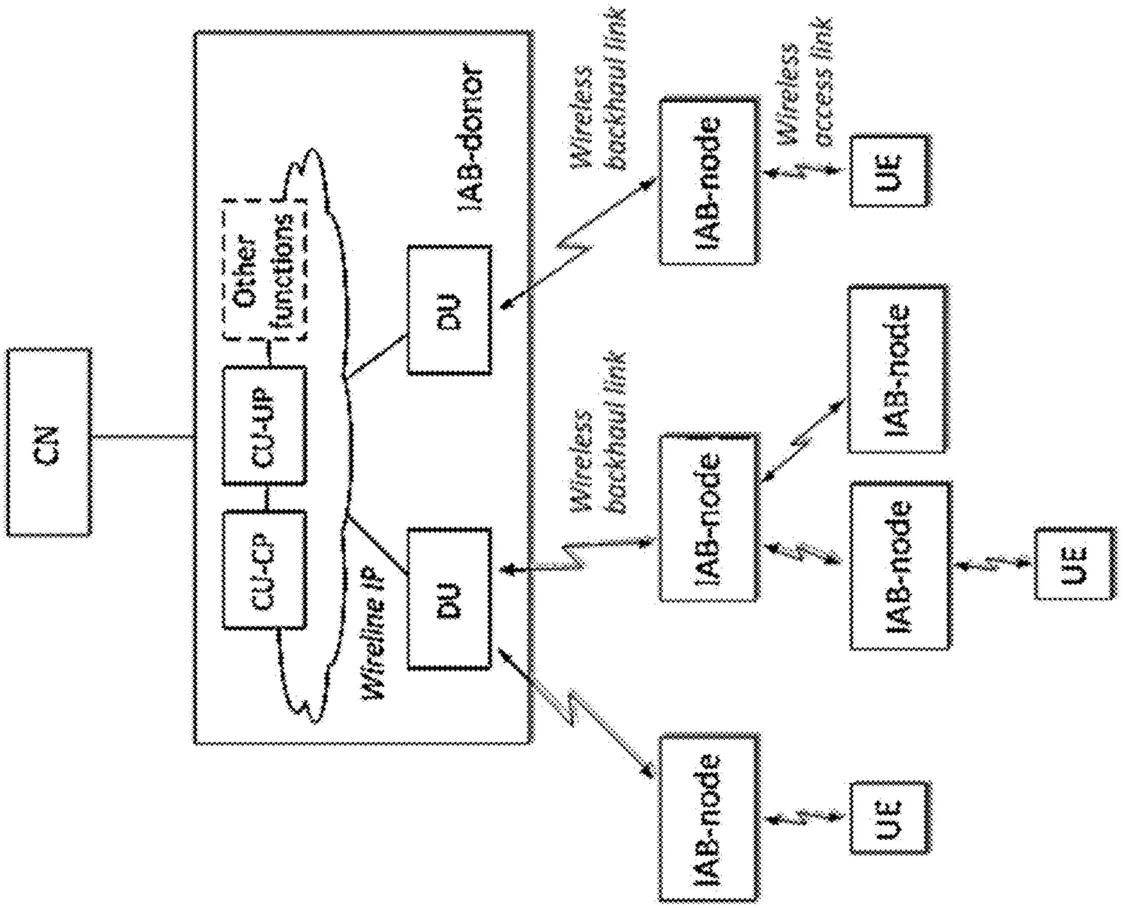
Fig. 1 PRIOR ART
FIG. 1 is a is a reference diagram depicting IAB-architectures.
Figure 2:
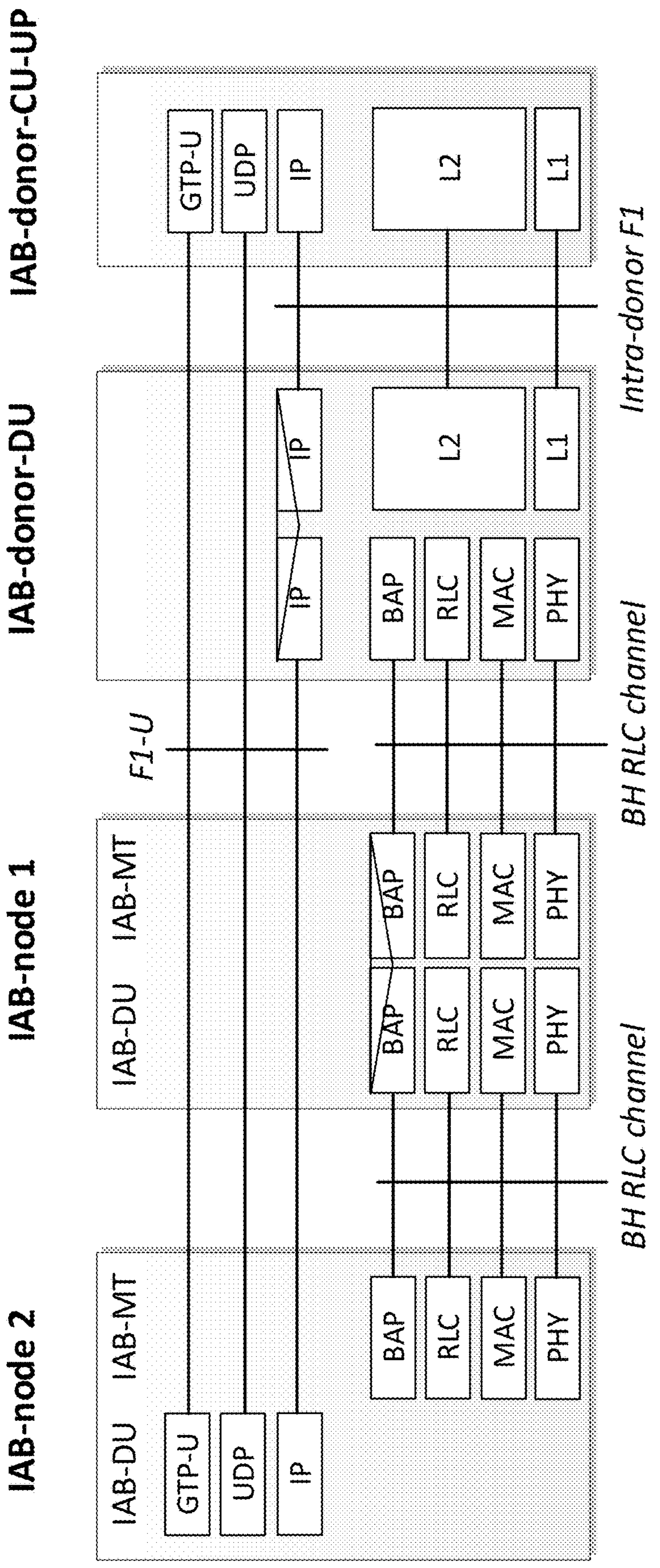
PRIOR ART Fig. 2
FIG. 2 shows a baseline User Plane (UP) Protocol stack for IAB in rel-16 according to prior art.
Figure 3:
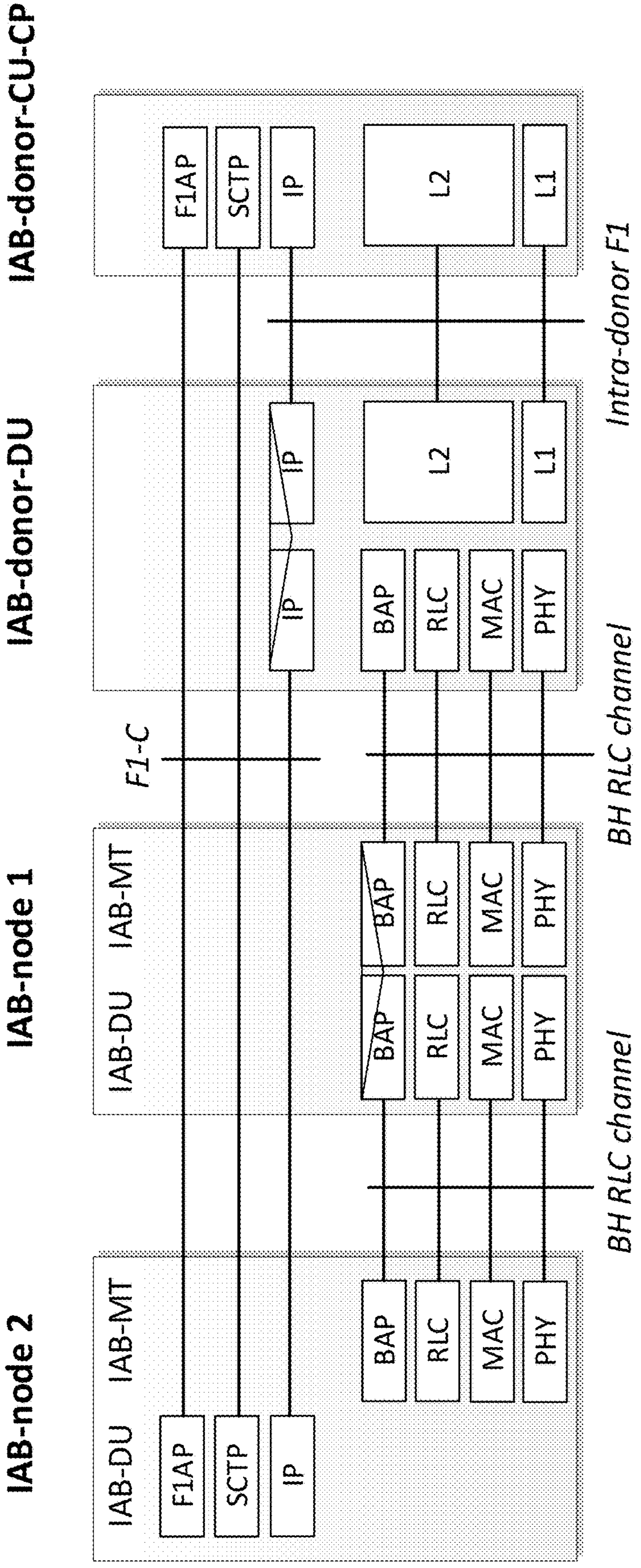
PRIOR ART Fig. 3
FIG. 3 shows a baseline control plane (CP) Protocol stack for IAB in rel-16 according to prior art.
Figure 4:
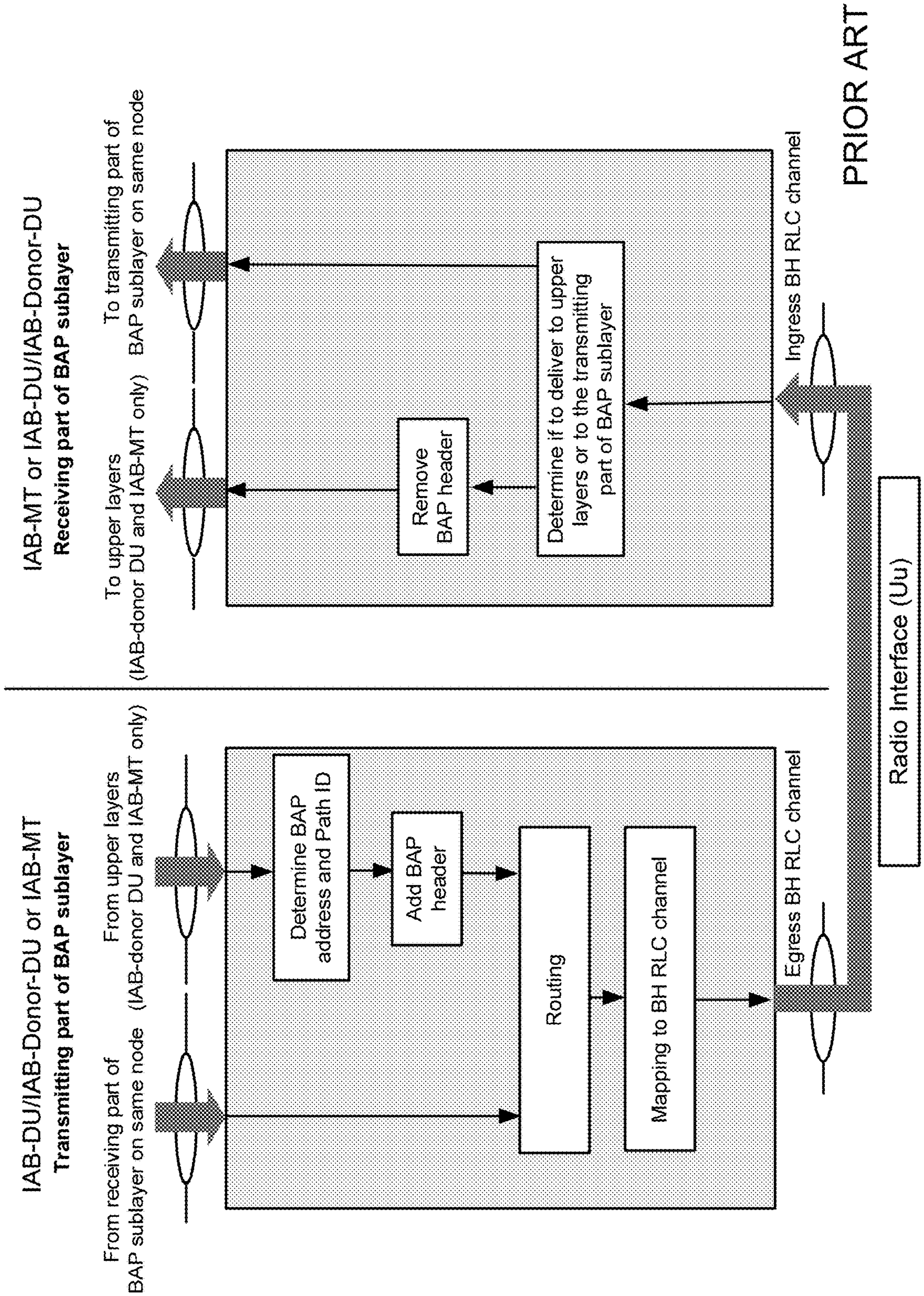
PRIOR ART Fig. 4
FIG. 4 shows an example of functional view of BAP sublayer according to prior art.
Figure 5A:
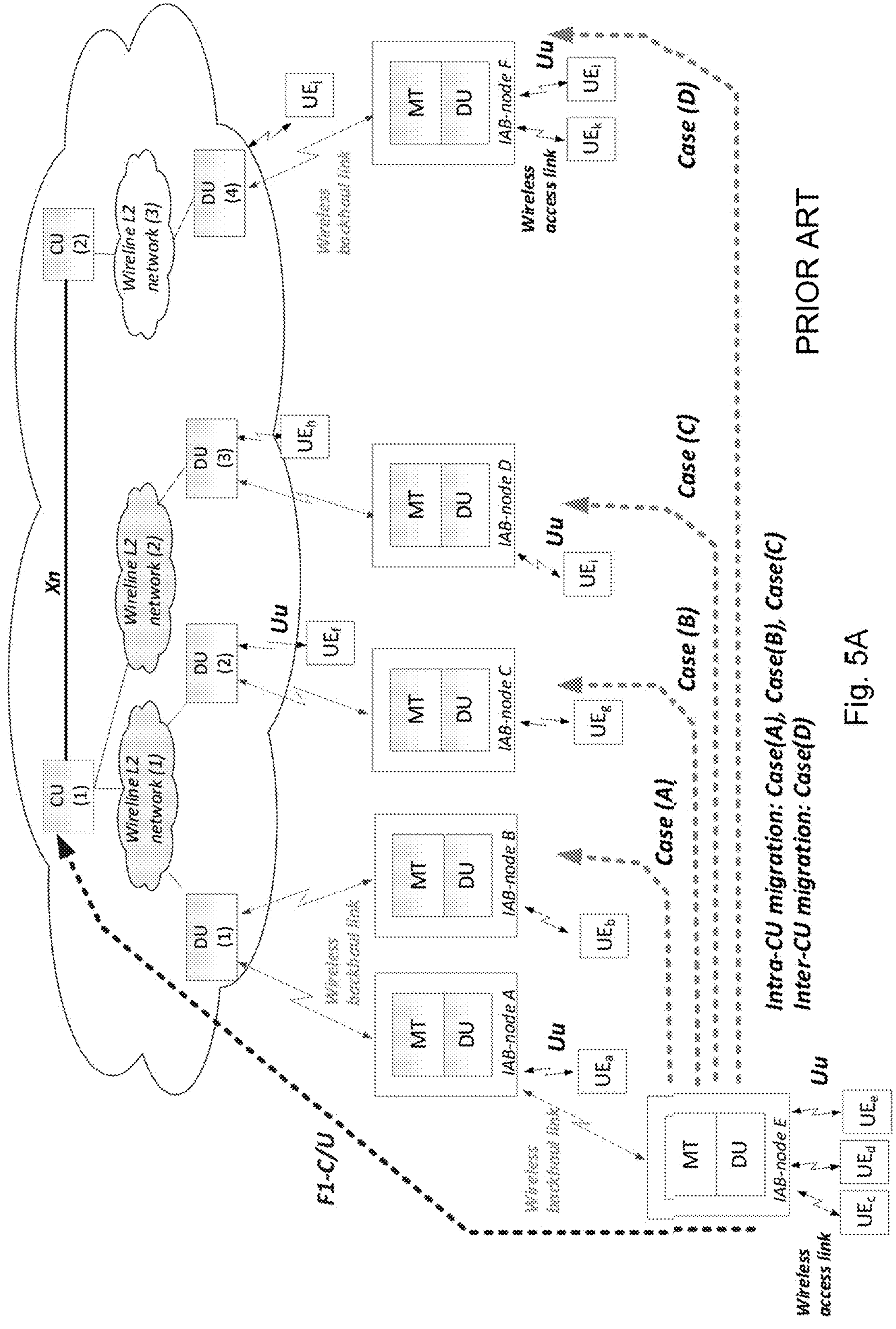
PRIOR ART Fig. 5A
FIG. 5A shows examples of different possible scenarios for IAB-node migration according to prior art.
Figure 5B:
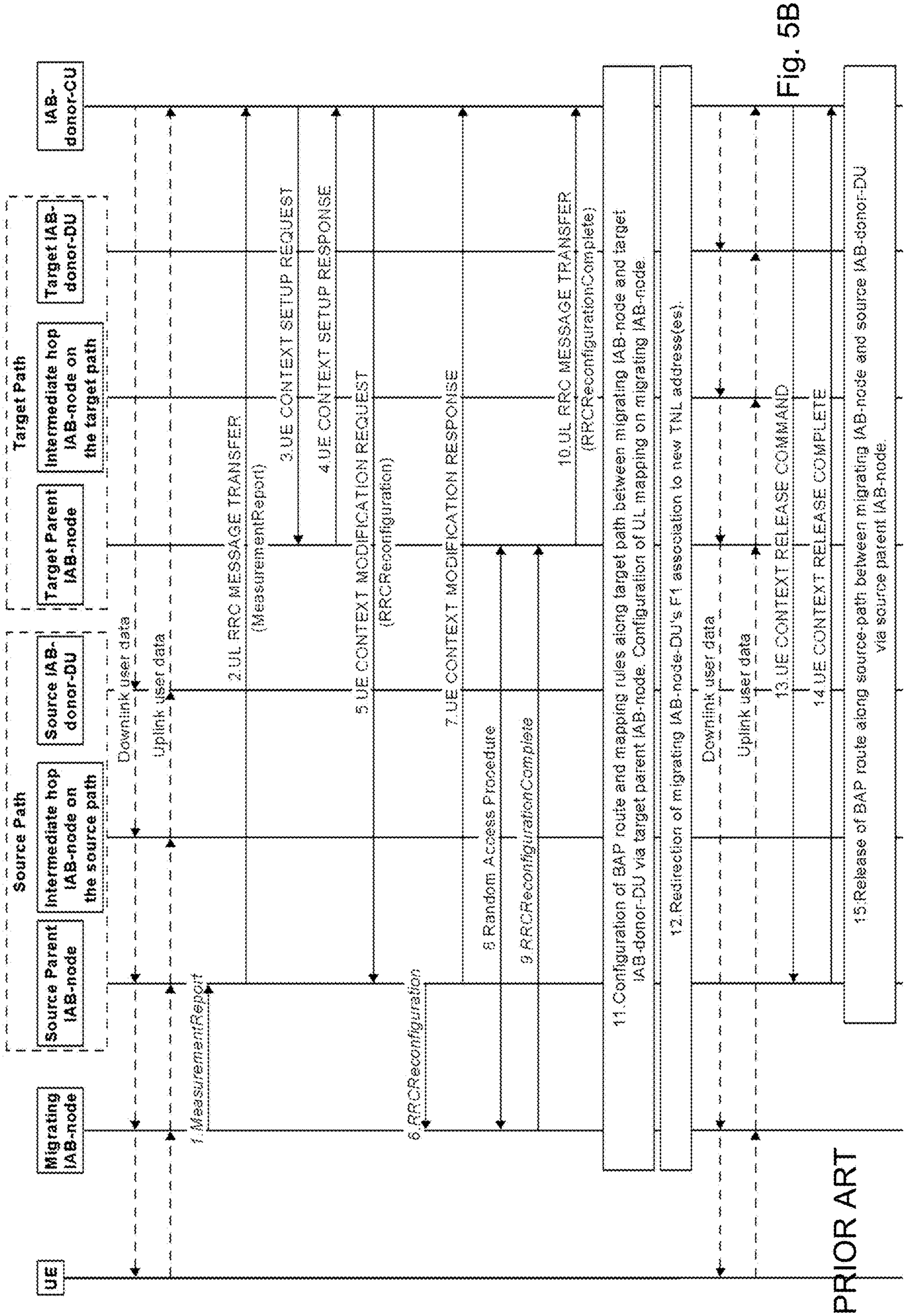
Fig. 5B PRIOR ART
FIG. 5B is a IAB intra-CU topology adaptation procedure according to prior art.
Figure 6A:
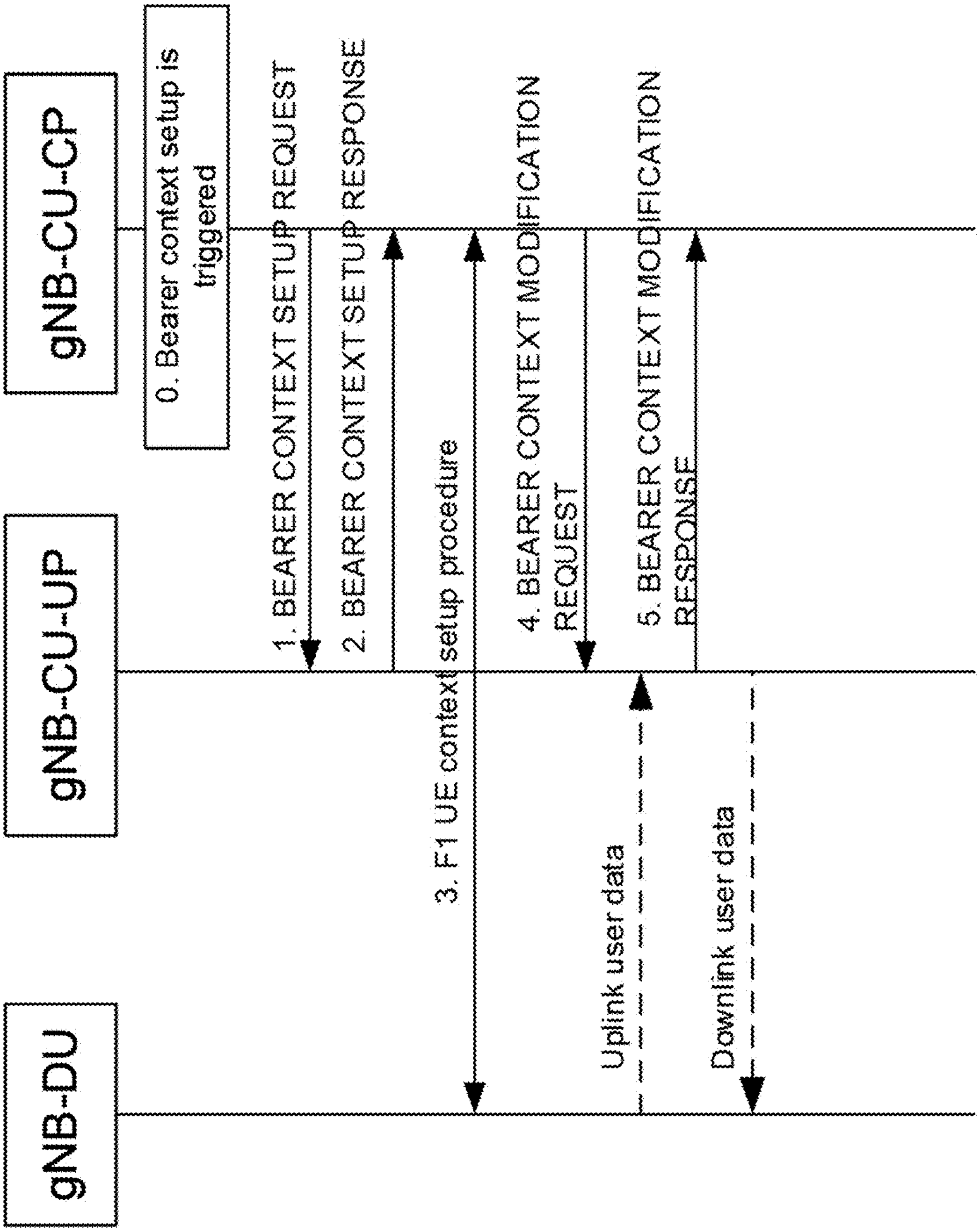
PRIOR ART Fig. 6A
FIGS. 6A-6E show signalling schemes according to prior art.
Figure 6B:
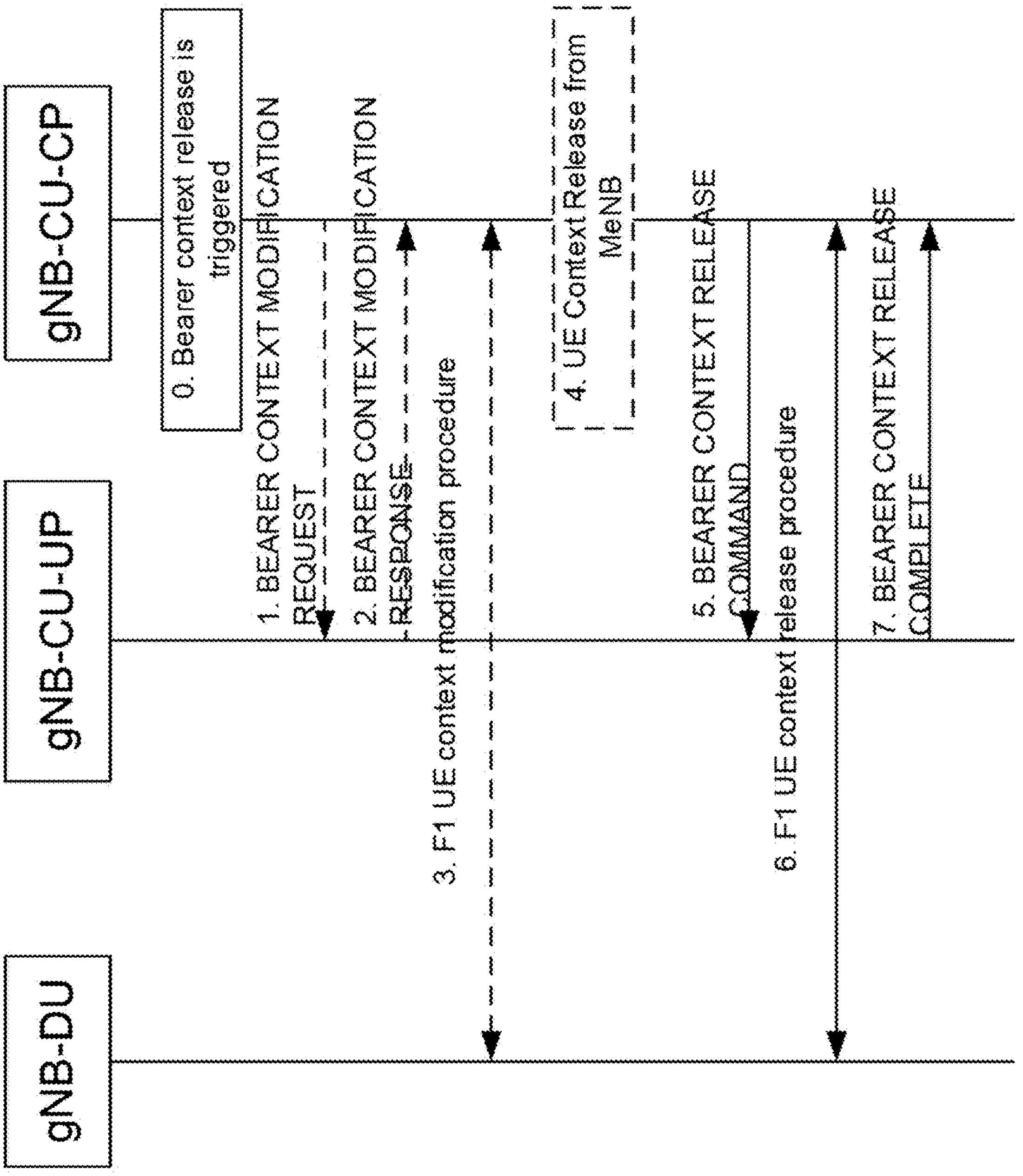
Fig. 6B PRIOR ART
Figure 6C:
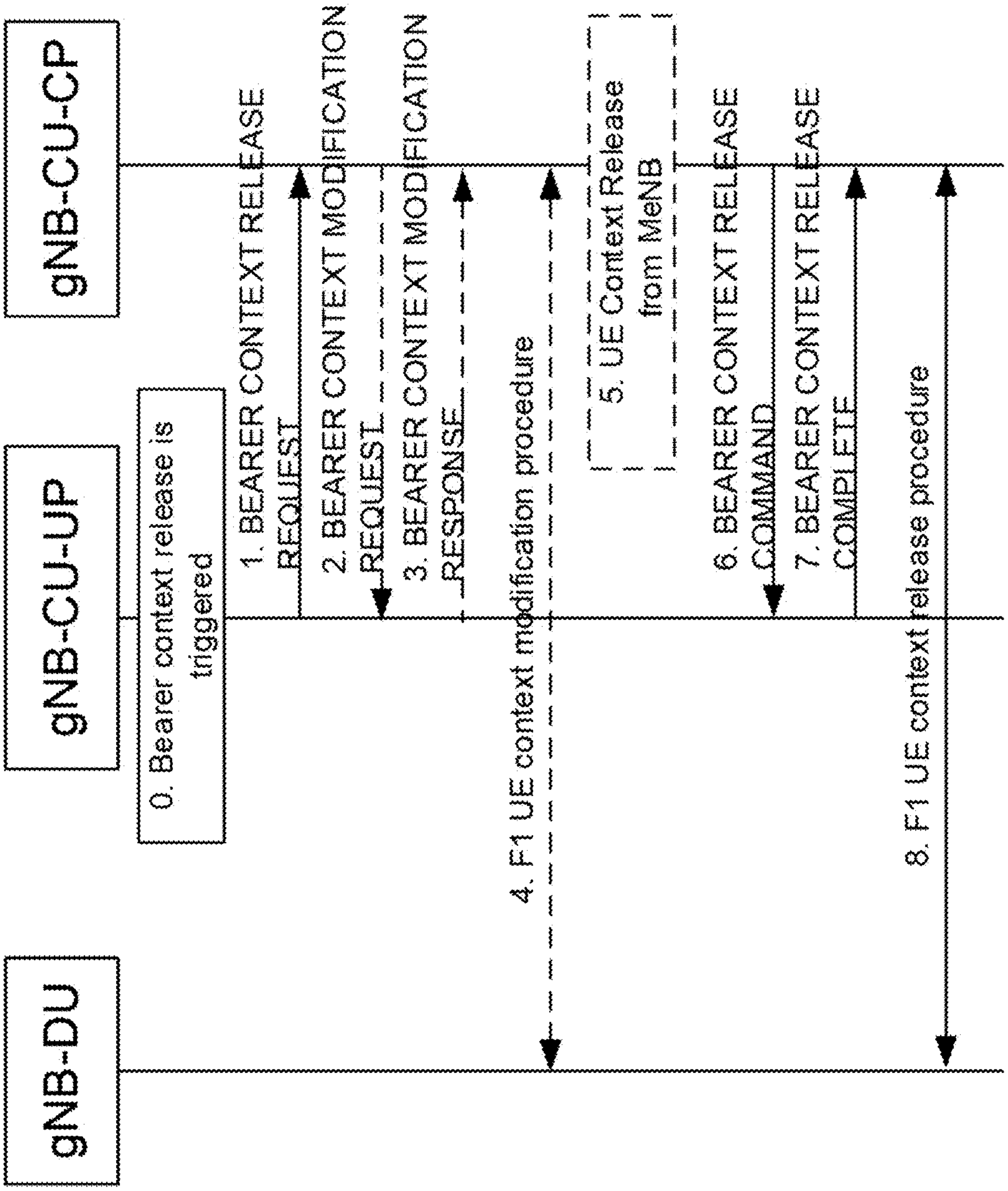
Fig. 6C PRIOR ART
Figure 6D:
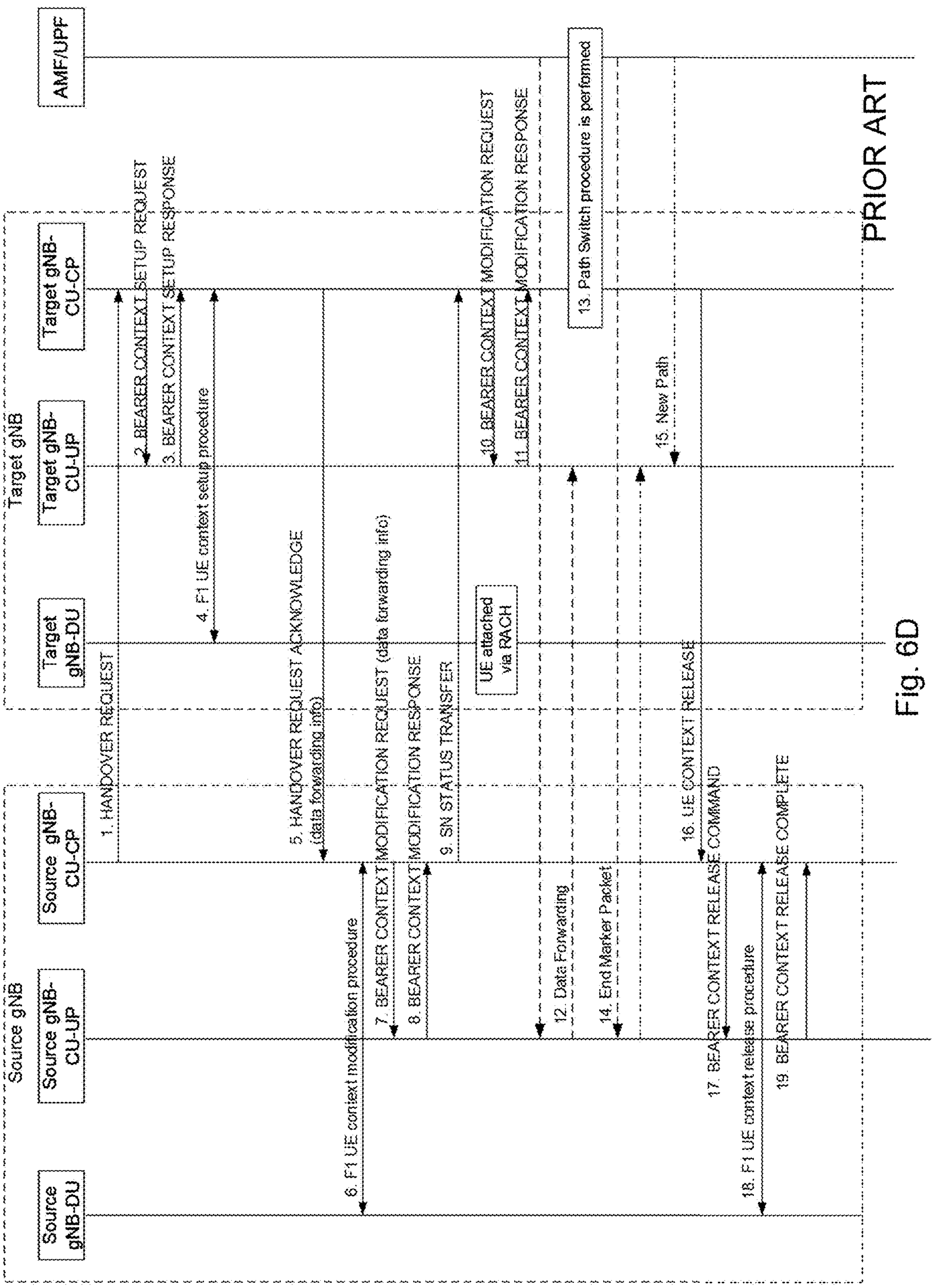
Fig. 6D PRIOR ART
Figure 6E:
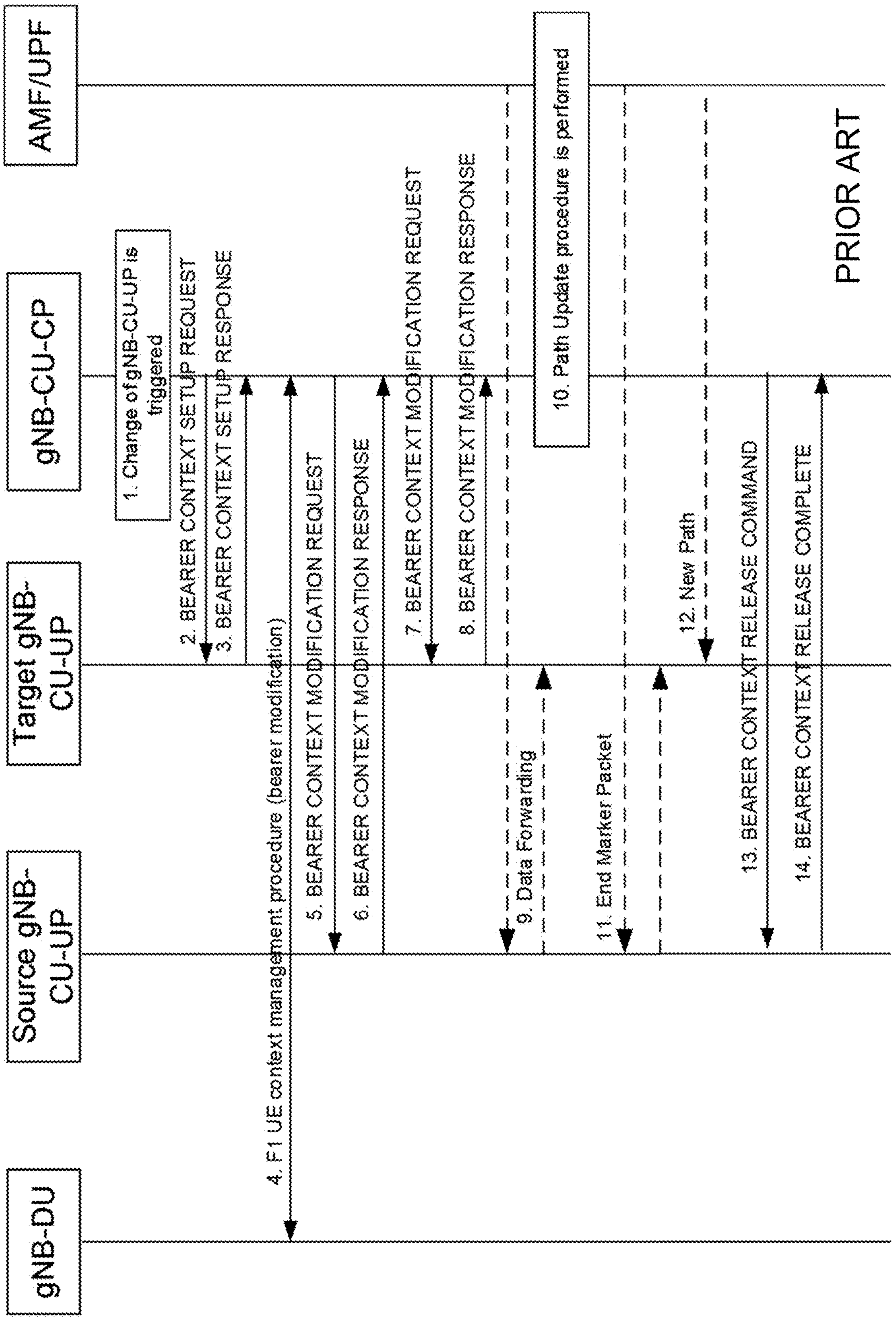
Figure 7:
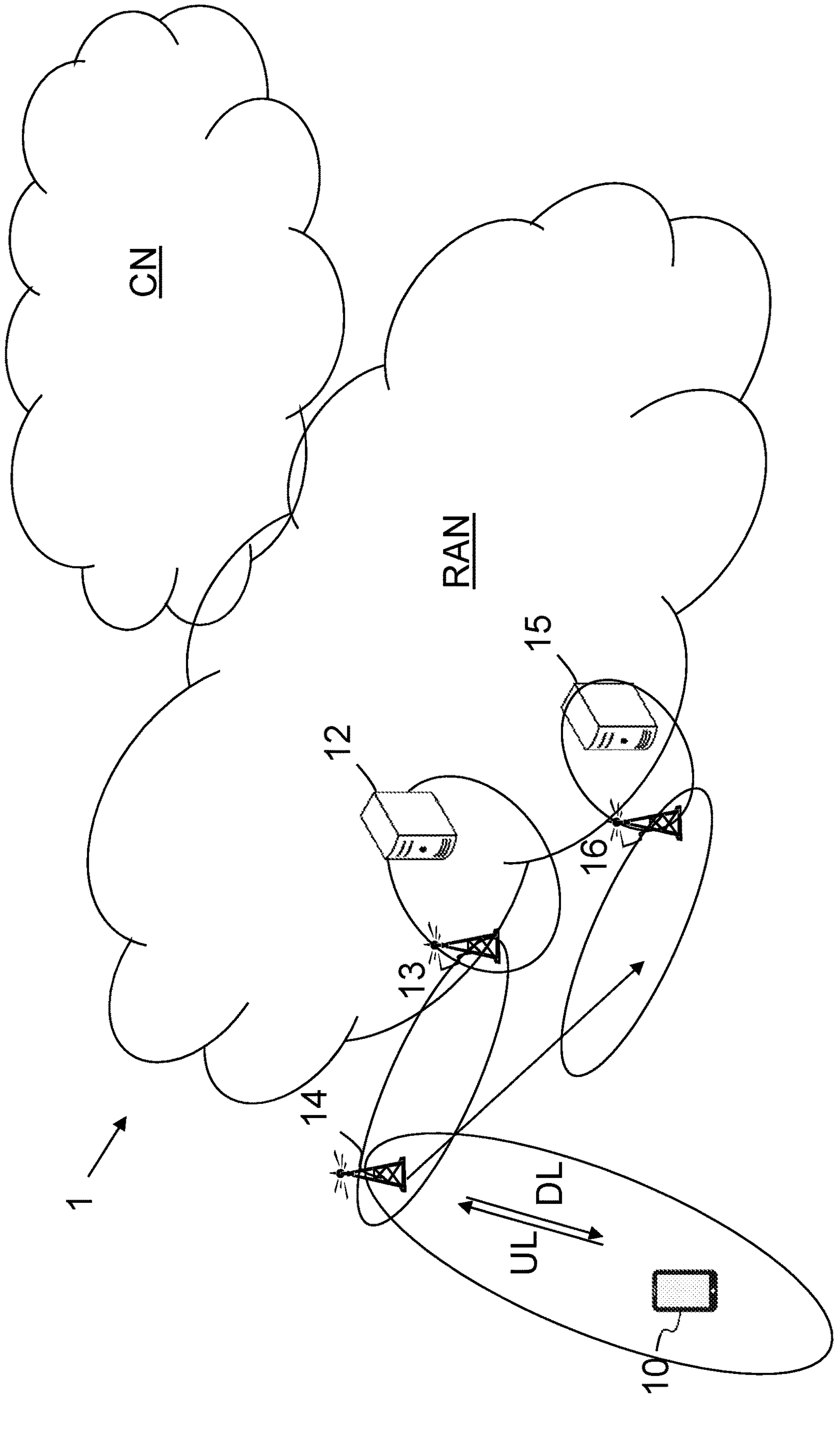
FIG. 7 is a schematic overview depicting a wireless communications network according to embodiments herein.

Embodiments herein relate to wireless communications networks in general. FIG. 7 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 such as a mobile station, a wireless device, a non-access point (non-AP) STA, a STA, and/or a wireless terminal, is comprised communicating via e.g. one or more Access Networks (AN), e.g. RAN, to one or more core networks (CN). It should be understood by the skilled in the art that "UE" is a non-limiting term which means any terminal, wireless communications terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a first radio network node 12 such as a IAB-donor node such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point or any other network unit or node capable of communicating with a wireless device within a service area served by the radio network node depending e.g. on a first radio access technology and terminology used. The first radio network node 12 may also be referred to as serving or source node or RAN node.

The wireless communication network 1 further comprises a first intermediate radio network node 13 connected in-between the first radio network node 12 and the UE 10. The first intermediate radio network node 13 may be an IAB node such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a first radio access technology and terminology used.

The wireless communication network further comprises a second intermediate radio network node 14 connected in-between the first radio network node 12 and the UE 10. The second intermediate radio network node 14 may be connected to the UE 10 directly and may be an egress point. The second intermediate radio network node 14 may be an IAB node such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a radio access technology and terminology used.

Furthermore, the wireless communications network 1 comprises a second radio network node 15 such as a IAB-donor node such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), MME, AMF, a stand-alone access point or any other network unit or node capable of communicating with a wireless device within a service area served by the radio network node depending e.g. on a radio access technology and terminology used. The second radio network node 15 may be referred to as a target node or RAN node.

The wireless communication network 1 may further comprise a third intermediate radio network node 16 connected in-between the second radio network node 15 and served UEs. The third intermediate radio network node 16 may be an IAB node such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within a service area served by the radio network node depending e.g. on a radio access technology and terminology used. It should be noted that a service area may be denoted as cell, beam, beam group or similar to define an area of radio coverage.

Embodiments herein disclose to selectively cancel the handover of a subset of one or more other nodes, such as UEs and/or IAB nodes, served by a migrating node, thereby making it possible to relocate only the UEs and/or IAB nodes that will get a desired level of performance at the second radio network node 15, enabling to find alternate radio network nodes for the subset of one or more other nodes whose handover is cancelled. This will lead to a reduced handover time and control plane signaling, leading to optimal performance of the wireless communications network.

Figure 8:
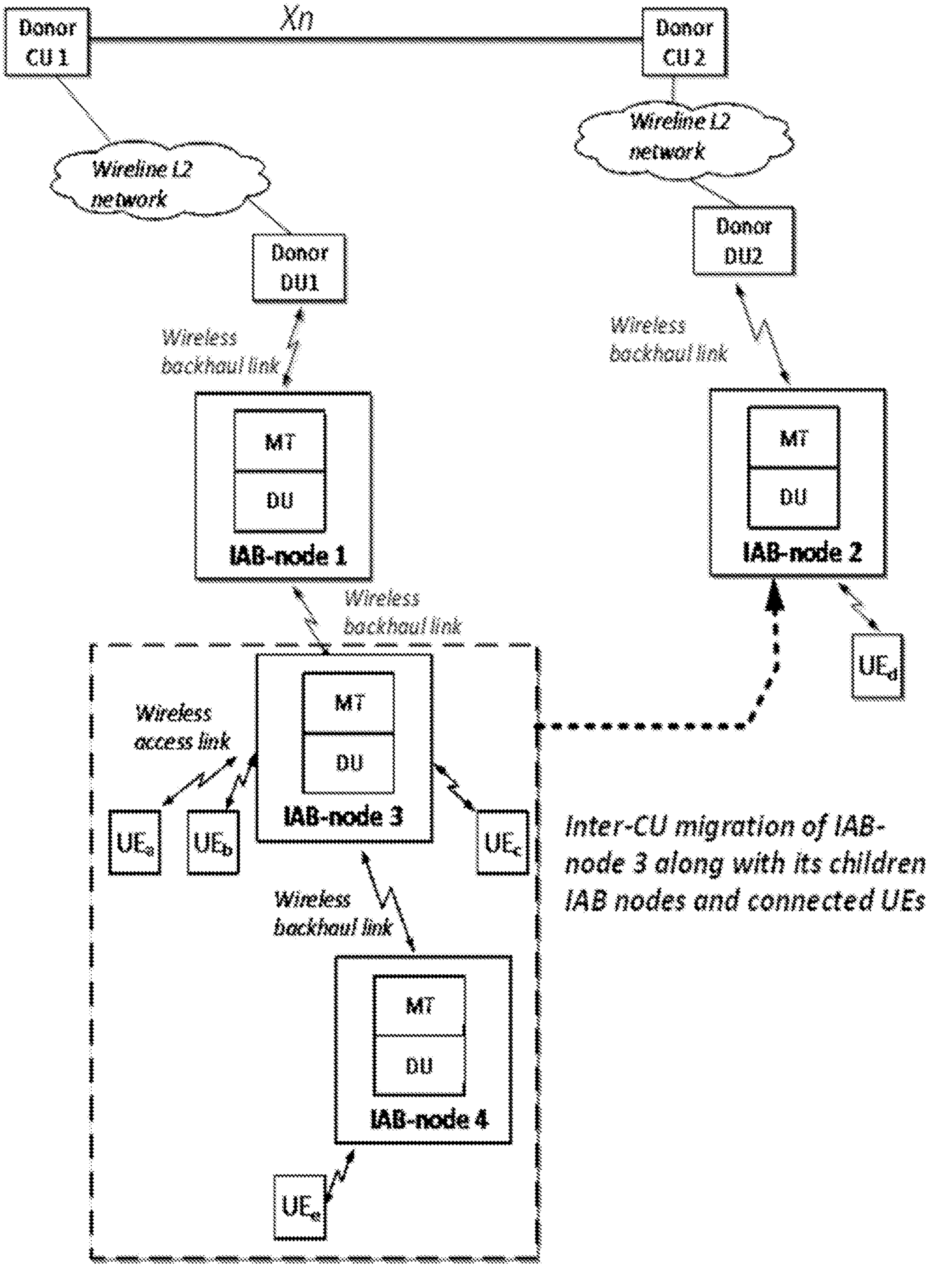
FIG. 8 is a schematic overview depicting a wireless communications network according to embodiments herein.

FIG. 8 shows an example of IAB network handover scenario.

The IAB node 3, being an example of the migrating node, is to be handover to the IAB node 2, being an example of the second radio network node 15. The IAB node 3 is serving one or more other nodes such as UEa, UEb, UEc, IAB node 4, and UEe. FIG. 8 is showing an inter-CU migration of the IAB node 3 with its children IAB node and connected UEs.

- The inter-CU IAB node migration may be caused by e.g. radio link failure (RLF), load balancing, IAB node mobility. These are non-limiting examples.
- The terms migration, handover and mobility are used interchangeably.
- The terms "gNB-CU" and "Donor-CU", "donor", "CU-CP" and "CU" are used interchangeably.
- All considerations for a split donor, i.e. donor CU, are equally applicable for a non-split donor, i.e. donor gNB.
- The terms "backhaul RLC channel" and "BH RLC channel" and "BH bearer" are used interchangeably.
- The term "gNB" applies to all variants therein, e.g. "gNB", "en-gNB" etc.
- The example topology shown in FIG. 8 is used for the embodiments herein, where IAB-Donor CU1 has an F1 interface with IAB-node 3 DU, while the MT functionality of the IAB-node 3, i.e. IAB-MT-3, is connected/served by IAB-node 1.
- The term source parent node refers to the node that was serving the migrating IAB node before the handover, i.e. a source donor DU in case the migrating IAB node was just one hop away from the source CU, or a parent IAB node, in case the migrating IAB node was multiple hops away from the source CU.
- The term target parent node refers to the radio network node that will serve the migrating IAB node after the handover, i.e. a target donor DU in case the migrating IAB node will be connected just one hop away from the target CU, or a parent IAB node, in case the migrating IAB node will be multiple hops away from the target CU.
- All the cells of the DUs controlled by the same donor CU, i.e. the donor DU and the IAB-DUs of all IAB nodes that are under the same donor CU, are also referred to as being served by the donor CU.
- Though the scenario here is the migration of IAB nodes, the mechanisms are applicable to any kind of group mobility where the handover of several UEs is performed at once.
- The term "a UE/IAB node directly served by the migrating IAB node" refers to a UE/IAB node that is directly connected to the migrating IAB node.
- The term "a UE/IAB node is indirectly served by the migrating IAB node" means that the migrating IAB node is an ancestor node to an IAB node that is currently serving the UE or IAB node.
- The term concerned UE/IAB node refers to a UE/IAB node that is directly/indirectly being served by the migrating IAB node and the migrating IAB node itself.
- Embodiments herein are presented on a non-limiting example of Xn handover, but it is applicable to the NG, S1 and X2 handovers as well.

Embodiments herein propose mechanisms during the handover of the migrating node such as an IAB node to selectively cancel the handover of only a subset of the UEs and/or IAB nodes, herein referred to as one or more nodes, that are involved in the handover due to association with the migrating node.

Figure 9:
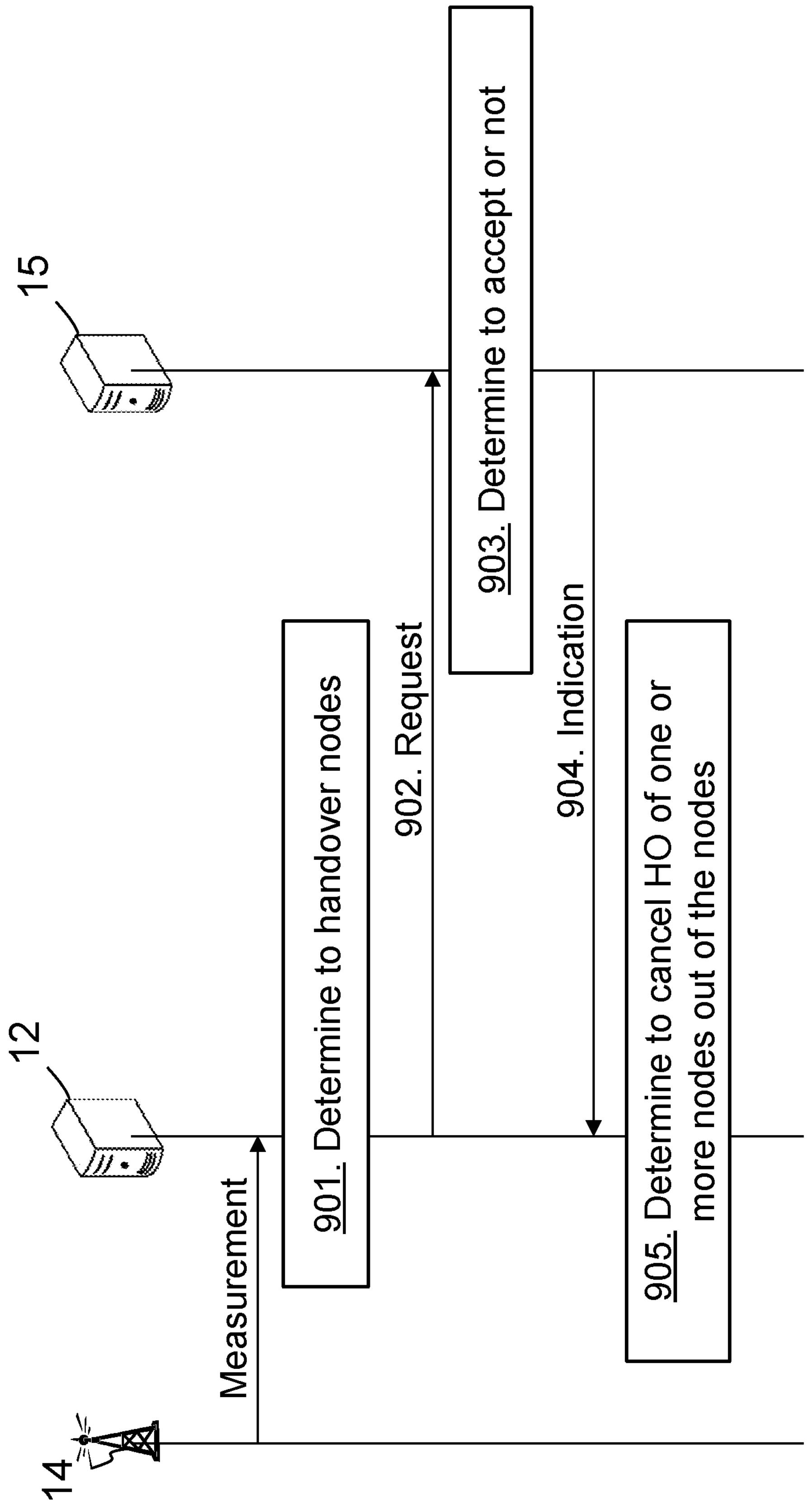
FIG. 9 is a is a combined signalling scheme and flowchart according to some embodiments herein.

FIG. 9 is a combined signalling scheme and flowchart depicting some embodiments herein wherein the first radio network node 12 is exemplified as a first IAB-donor CU and the second radio network node 15 is exemplified as a second IAB-donor CU.

Action 901. The first radio network node 12 may decide to handover a migrating node such as an IAB node, for example, the second intermediate radio network node 14, to the second radio network node 15 or a plurality of nodes such as radio network nodes and/or UEs. This may be decided based on measurements, load conditions of the different radio network nodes, mobility or configured. The cause may be e.g. RLF, load balancing, and/or IAB node mobility.

Action 902. The first radio network node 12 may transmit, for example, a message such as a handover request to the second radio network node 15, wherein the handover request comprises data, being an indication, associated with the migrating node e.g. IAB node and data related to one or more other nodes, such as IAB nodes and/or UEs, directly and indirectly served by the migrating node. The data may indicate one or more resources required to serve the migrating node and/or one or more other nodes.

Action 903. The second radio network node 15 may then decide or determine whether to accept the handover or not for the migrating node and/or the one or more other nodes.

Action 904. The second radio network node 15 transmits an indication back to the first radio network node 12 reflecting the decision.

Action 905. The first radio network node 12 then handle the handover of the migrating node and/or one or more other nodes based on the received indication. The first radio network node 12 determines a subset of the nodes of the request such as UEs and IAB nodes for which the handover should be cancelled but may also determine for which UEs and IAB nodes the handover should be accepted.

Figure 10:
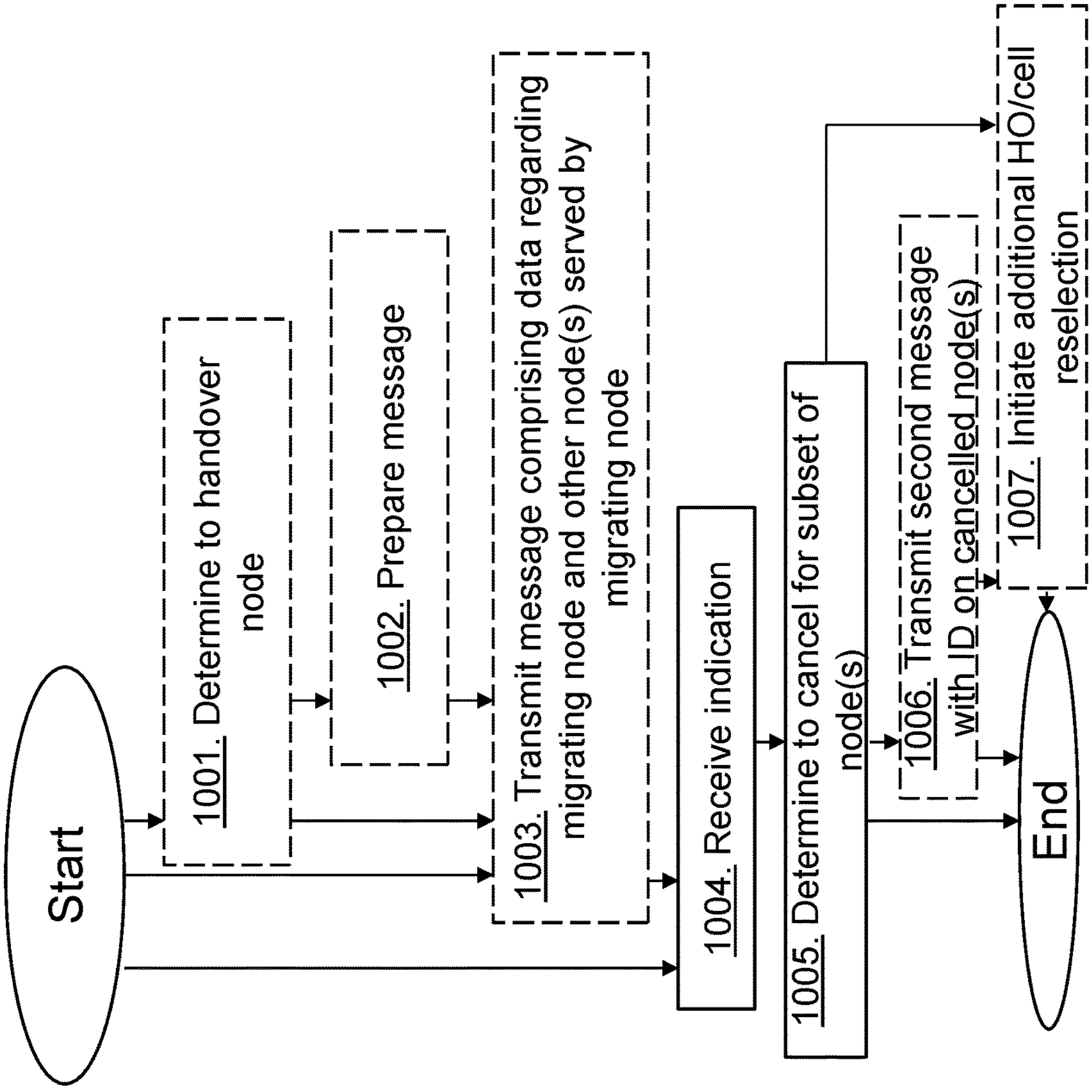
FIG. 10 is a schematic flowchart depicting a method performed by a first radio network node according to embodiments herein.

The method actions performed by the first network node 12 for handling communication in the wireless communications network 1 according to embodiments herein will now be described with reference to a flowchart depicted in FIG. 10. The wireless communications network 1 may comprise the first radio network node 12 and the second radio network node 15 and one or more nodes relaying data packets between the radio network nodes and the UE 10. The migrating node may be an intermediate radio network node between the first radio network node 12 and UEs. The first radio network node 12 may be a source IAB donor CU and the second radio network node 15 may be a target IAB donor CU.

Action 1001. The first radio network node 12 may determine to handover the node to the second radio network node. The first radio network node 12 may determine to handover or perform cell reselection based on measurements, load conditions or be configured. For example, the first radio network node 12 may decide to handover an IAB node to a target cell that belongs to a second network node (target Donor-CU).

Action 1002. The first radio network node 12 may prepare a message such as a handover request for the second radio network node 15. The first radio network node 12 may, for example, prepare a HANDOVER REQUEST message, such as an enhanced Xn HANDOVER REQUEST message or a newly defined message, to the second radio network node 15, and including in this handover request message the contexts of the UEs and IAB nodes that are directly or indirectly served by the migrating node, as well as the corresponding info for the migrating node itself.

Action 1003. The first radio network node 12 may transmit to the second radio network node 15, the message related to the handover or the cell reselection of the migrating node to the second radio network node 15, wherein the message comprises data associated with the migrating node, and data related to the one or more other nodes, directly and indirectly served by the migrating node. The message may be a handover request to the second radio network node 15, wherein the handover request comprises data, or an indication of resources needed for being served, signalling requirements etc., associated with the migrating node, e.g. IAB node, and data related to other nodes, such as IAB nodes and/or UEs, directly and indirectly served by the migrating node i.e. plurality of nodes. The data may indicate one or more resources required to serve the migrating node and/or the other nodes. The transmitted message may comprise a HANDOVER REQUEST message.

Action 1004. The first radio network node 12 receives from the second radio network node 15, the indication indicating whether handover or cell reselection to the second radio network node 15 is confirmed or not, wherein the indication indicates whether the migrating node 15 and/or the one or more other nodes, directly and indirectly served by the migrating node 15, are accepted or cancelled for handover or cell reselection to the second radio network node 15. The indication may indicate whether one or more nodes are accepted or cancelled for Handover (HO) to the second radio network node 15. The received indication may be comprised in a HANDOVER REQUEST ACKNOWLEDGE message. Thus, the first radio network node 12 may receive a HANDOVER REQUEST ACKNOWLEDGE message, such as an enhanced Xn HANDOVER REQUEST ACKNOWLEDGE message or a newly defined message, being an example of the received indication.

Action 1005. The first radio network node 12 determines to cancel handover or cell reselection of a subset of the one or more other nodes based the received indication. The first radio network node 12 may determine to cancel handover or cell reselection of the subset of the one or more other nodes further based on one or more parameters. The one or more parameters may comprise: architecture of the one or more other nodes and/or signalling measurements associated with the one or more other nodes. Thus, the first radio network node 12 may handle the handover process, for example, cancel handover, of one or more nodes out of the plurality of nodes in the message related to handover of cell reselection based on one or more parameters such as the received indication, architecture of nodes (how they are related) and/or signalling measurements associated with the nodes. The first radio network node 12 may further relocate another subset of the one or more other nodes, not being the subset cancelled, to the second radio network node 15 based on level of performance at the second radio network node 15. Thus, the received indication may indicate level of performance of the one or more other nodes at the second radio network node 15. For example, the first radio network node 12 may determine a subset of the one or more other nodes, such as UEs and IAB nodes, for which the handover or cell reselection should be accepted, or the handover or cell reselection should be cancelled. The determining may be based on considering one or more of the following:

- For UEs:
  - On the QoS flows that were indicated to be admitted in the handover request ACK, e.g. UEs who have less than x % of their QoS flows admitted, UEs who have some QoS flows with a certain profile such as guaranteed bit rate (GBR) QoS flows, QoS flows for ultra-reliable low-latency communication (URLLC), etc that were not admitted, UEs who have less than x % of their aggregate bit rate admitted, etc,
    - For a UE served directly by an IAB node DU, i.e. not a donor DU, for each DRB/signalling radio bearer (SRB) admitted at the target, it is necessary to also admit all the BH RLC channels carrying these SRBs/DRBs over all backhaul hops from the donor to the serving IAB DU.
- For IAB nodes:
  - If the IAB node is directly or indirectly serving any or a certain number of UEs which the source has decided to exclude from being handed over according to one of the criteria described above
  - Whether the DRBs of an IAB-MTs are admitted, the IAB-MT may use DRBs to establish critical connections, such as the connection to the operation and maintenance (O&M) system Similar to the above, admitting a DRB or SRB of an IAB-MT requires the admission of all BH RLC channel carrying these DRBs/SRBs over backhaul wireless hops.

Whether the BH RLC channels carrying F1-C signaling connections for an IAB node over all intermediate backhaul wireless hops have been admitted For both UEs and IAB nodes:

From earlier/recent measurement report received from the UEs/IAB-MTs, if it can be seen that there was an alternate possible parent node to which the UE/IAB-MT has good radio link quality, i.e. better off to handover them to the alternate parent, than the current serving IAB node for the concerned UE or IAB node.

Action 1006. The first radio network node 12 may then transmit a second message to the second radio network node 15 including identities of the determined subset of the one or more other nodes, indicating that the handover of the subset of the one or more other nodes should be cancelled. Thus, the first radio network node 12 may transmit another message to the second radio network node 15 including identities of the determined subset of UEs and IAB nodes, i.e. the one or more other nodes out of the plurality of nodes, indicating that the handover of the indicated other nodes should be cancelled. The transmitted second message may comprise a HANDOVER CANCEL message.

For example, the first radio network node 12 may prepare and send an enhanced HANDOVER CANCEL message or a newly defined message to the second radio network node 15, including the identities of the determined subset of UEs and IAB nodes, indicating that the handover of the indicated UEs/IABs should be cancelled.

Action 1007. The first radio network node 12 may further initiate an additional handover or cell reselection (change) of the determined subset of the one or more other nodes. For example, the UEs/IAB nodes whose identity is included in the handover cancel message, the first radio network node 12 may perform or initiate a handover procedure with a possible target node, e.g., based on the latest received measurement results from that particular UE or IAB-MT.

This could be an intra-CU handover, if the best candidate node was under the same (source) donor CU This could be yet another inter-CU handover, if the best candidate node was under a donor CU different from the source CU and previous target CU.

Thus, it is herein disclosed a method for the first radio network node 12, for example, operating as a source donor central unit (e.g. Donor-CU) in an IAB network, serving as a donor node for an IAB node (migrating IAB node) and providing connectivity for a UE.

Figure 11:
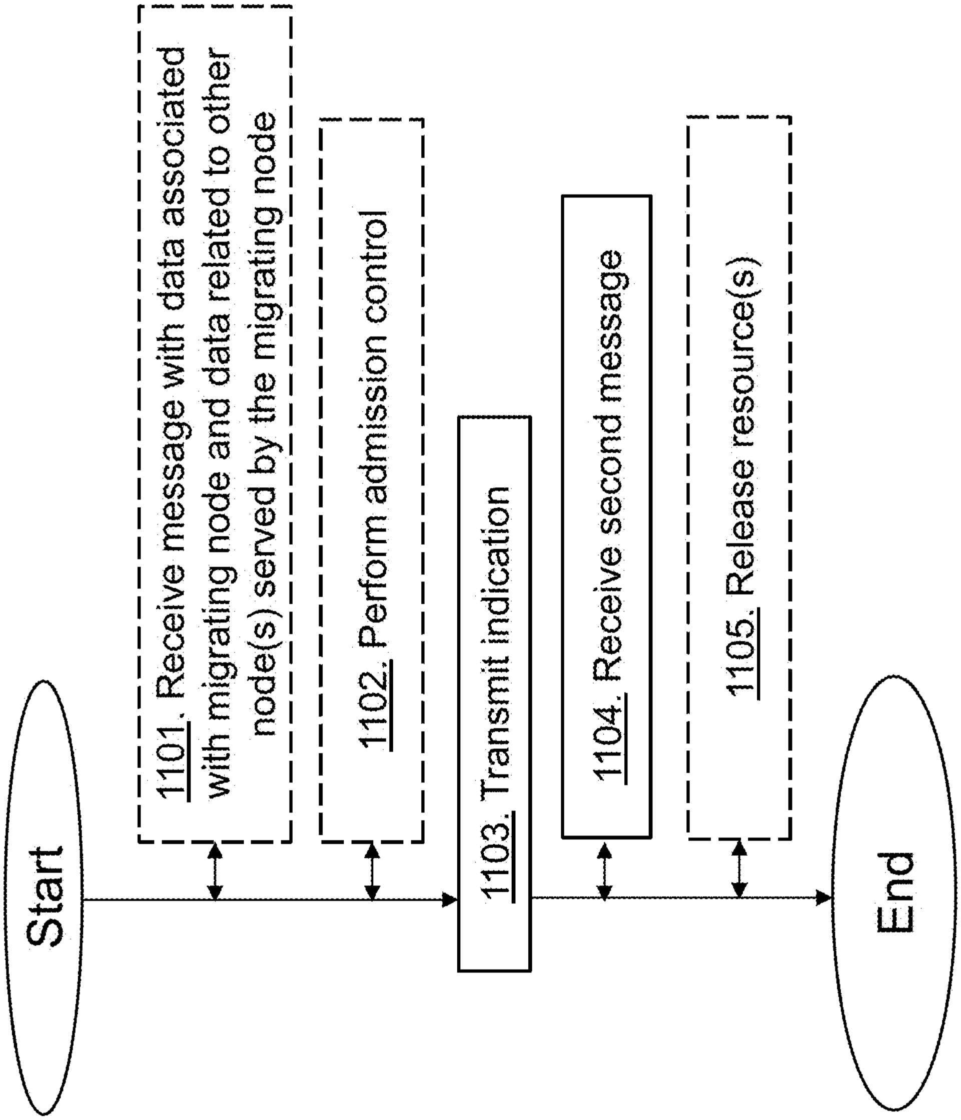
FIG. 11 is a schematic flowchart depicting a method performed by a second radio network node according to embodiments herein.

The method actions performed by the second radio network node 15, such as an IAB node, for handling communication in the wireless communications network 1 according to embodiments herein will now be described with reference to a flowchart depicted in FIG. 11. The wireless communications network may comprise the first radio network node 12 and the second radio network node 15 and one or more nodes relaying data packets between a central network node and a UE. The first radio network node 12 may be a source IAB donor CU and the second radio network node 15 may be a target IAB donor CU.

Action 1101. The second radio network node 15 may receive from the first radio network node 12, the message related to the handover or the cell reselection of the migrating node to the second radio network node 15, wherein the message comprises data associated with the migrating node, and data related to the one or more other nodes, directly and indirectly served by the migrating node. Thus, the second radio network node may receive the message related to handover or cell reselection of a node such as a handover request from the first radio network node 12, wherein the message comprises data, e.g. an indication, associated with the migrating node, e.g. IAB node, and data related to other nodes, such as IAB nodes and/or UEs, directly and/or indirectly served by the migrating node. The data may indicate one or more resources required to serve the nodes related to the message. The message received may comprise a HANDOVER REQUEST message. For example, the second radio network node 15 may receive the message such as a HANDOVER REQUEST message from the first radio network node 12, such as an enhanced Xn HANDOVER REQUEST message or a newly defined message, that includes the data such as contexts, BAP and backhaul-related information of the UEs and IAB nodes that are directly or indirectly served by the migrating node, Action 1102. The second radio network node 15 may perform admission control for the one or more other nodes included in the received message to determine whether to allow the handover or cell reselection of the one or more other nodes. The second radio network node 12 may thus determine or decide whether to allow the handover of the node e.g. performing admission control for the UEs and IAB nodes included in the received data. For example, the second radio network node 15 may perform admission control for the UEs and IAB nodes included in the handover request. Performing admission control for the UEs and IAB nodes included in the handover request, may consider:

The CP resources required to admit/handle the indicated UEs and IABs and their CP connections at the target network node The UP resources required to serve the migrating IAB-nodes and UEs (DRBs, QoS flows, PDU sessions, backhaul (BH) RLC channels)

The number of UE and IAB-MT contexts being migrated

The lower layer resources, e.g. radio resources such as symbols and/or frequencies, required to admit/handle the indicated UEs and IAB contexts at the target donor DU, i.e. on the first backhaul link between the target donor DU and the first IAB node on the path to the parent node that the migrating IAB node is being handed over to, or in the case of the migrating IAB node directly connecting to the target donor DU, the backhaul link between the target donor DU and the migrating IAB node The lower layer resources, i.e. radio resources, required to admit/handle the indicated UEs and IABs contexts at any intermediate IAB node between the target donor DU and the parent IAB node that the migrating IAB node is being handed over to, i.e. the backhaul links on each hop along the way Action 1103. The second radio network node 15 transmits to the first radio network node 12, the indication indicating whether handover or cell reselection to the second radio network node 15 is confirmed or not, wherein the indication indicates whether a migrating node and/or one or more other nodes, directly and indirectly served by the migrating node, are accepted or cancelled for handover or cell reselection to the second radio network node 15. Thus, the second radio network node 15 transmits an indication wherein the indication indicates acceptance or not. The indication may further indicate one or more nodes that has been accepted or not. The indication may be comprised in a HANDOVER REQUEST ACKNOWLEDGE message. For example, the second radio network node 15 may prepare and send a HANDOVER REQUEST ACKNOWLEDGE message, such as an enhanced Xn HANDOVER REQUEST message or a newly defined message, to the first radio network node 12. The indication sent may be a list of admitted and not admitted BH RLC channels and PDU session resources that are associated with the concerned one or more other nodes such as UEs and IAB nodes.

If the handover cannot be performed, the indication may comprise a handover response message being the HANDOVER PREPARATION FAILURE message, e.g. a modified version of the Xn Handover Preparation Failure message or a new message defined for this purpose.

If the handover can be performed, the indication may comprise a handover response message being the HANDOVER REQUEST ACKNOWLEDGE message, such as a modified version of the Xn Handover Request Acknowledge message or a new message defined for this purpose.

Including in the indication or message comprising the indication may the IAB-MT/UE/DU contexts that has been admitted, e.g. QoS flows/PDU sessions admitted.

Action 1104. The second radio network node 15 may receive the second message from the first radio network node 12 including identities of the determined subset of the one or more other nodes. Thus, the second radio network node 15 may release resource(s) related or associated with the indicated one or more nodes. For example, the second radio network node 15 may release the context, BAP and backhaul RLC channel resources associated with the indicated UEs and IAB nodes.

Thus, embodiments herein may propose a method for the second radio network node 15, for example, operating as a target donor central unit (e.g. Donor-CU) in an IAB network, serving as a candidate donor node for an IAB node (migrating IAB node such as the second intermediate radio network node 14) and providing connectivity for a user equipment (UE). PS Example Implementation An example implementation of an Xn IAB GROUP HANDOVER CANCEL message is shown below as the second message mentioned above wherein added information is underlined. This is a non-limiting example, similar principles can be applied for the S1, X2 and NG handover messages as well.

IAB Group Handover Cancel

This message is sent by the source NG-RAN node to the target NG-RAN node to cancel an ongoing IAB group handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node migrating IAB node XnAP ID | M | | NG-RAN node UE XnAP ID 9.2.3.16 | Allocated at the source NG-RAN node. | YES | reject |
| Target NG-RAN node XnAP ID for the migrating IAB node | O | | NG-RAN node UE XnAP ID 9.2.3.16 | Allocated at the target NG-RAN node. | YES | ignore |
| Handover cancelled for the migrating IAB node | | | ENUMERATED (true, false, . . . ) | | YES | reject |
| UE Context List | M | 1 | | | | |
| >UE Context item | | 1 . . . <maxnoofservedUEs> | | The UE for which the handover is cancelled. | | |
| >Cause | M | | 9.2.3.2 | | YES | ignore |
| IAB-MT Context List | M | 1 | | | | |
| >IAB-MT Context Item | | 1 . . . <maxnoofservedIABnodes> | | The IAB node for which the handover is cancelled. | | |
| >Cause | M | | 9.2.3.2 | | YES | ignore |

nodes of the migrating node and/or the one or more other nodes, indicating that the handover of the indicated subset of nodes should be cancelled. Thus, the second radio network node 15 may receive another message including identities of a subset of nodes such as UEs and IAB nodes, i.e. the one or more nodes out of a plurality of nodes associated with the indication, and may further indicate that the handover of the indicated nodes should be cancelled. The second message may comprise a HANDOVER CANCEL message. For example, the second radio network node 15 may receive a HANDOVER CANCEL message (an enhanced Xn HANDOVER CANCEL message or a newly defined message) from the first radio network node 12 that includes the identities of the UEs/IAB nodes whose handover should be cancelled.

Action 1105. The second radio network node 15 may further release one or more resources related to the subset of In the above message, it may be necessary to introduce a new IAB-specific cause values, some non-limiting examples: "not enough resources for the UE admitted", "not enough resources for the IAB-MT admitted", "critical resources for the UE not admitted", "critical resources for the IAB-MT not admitted", "the BH RLC channels for carrying the DRB/SRB not admitted", "resources for IAB-MT's operation, administration and maintenance (OAM) connection not admitted", "a better target cell found for the UE" "a better target cell found for the IAB-MT", "a better target parent found for the UE" "a better target parent found for the IAB-MT".

Figure 12:
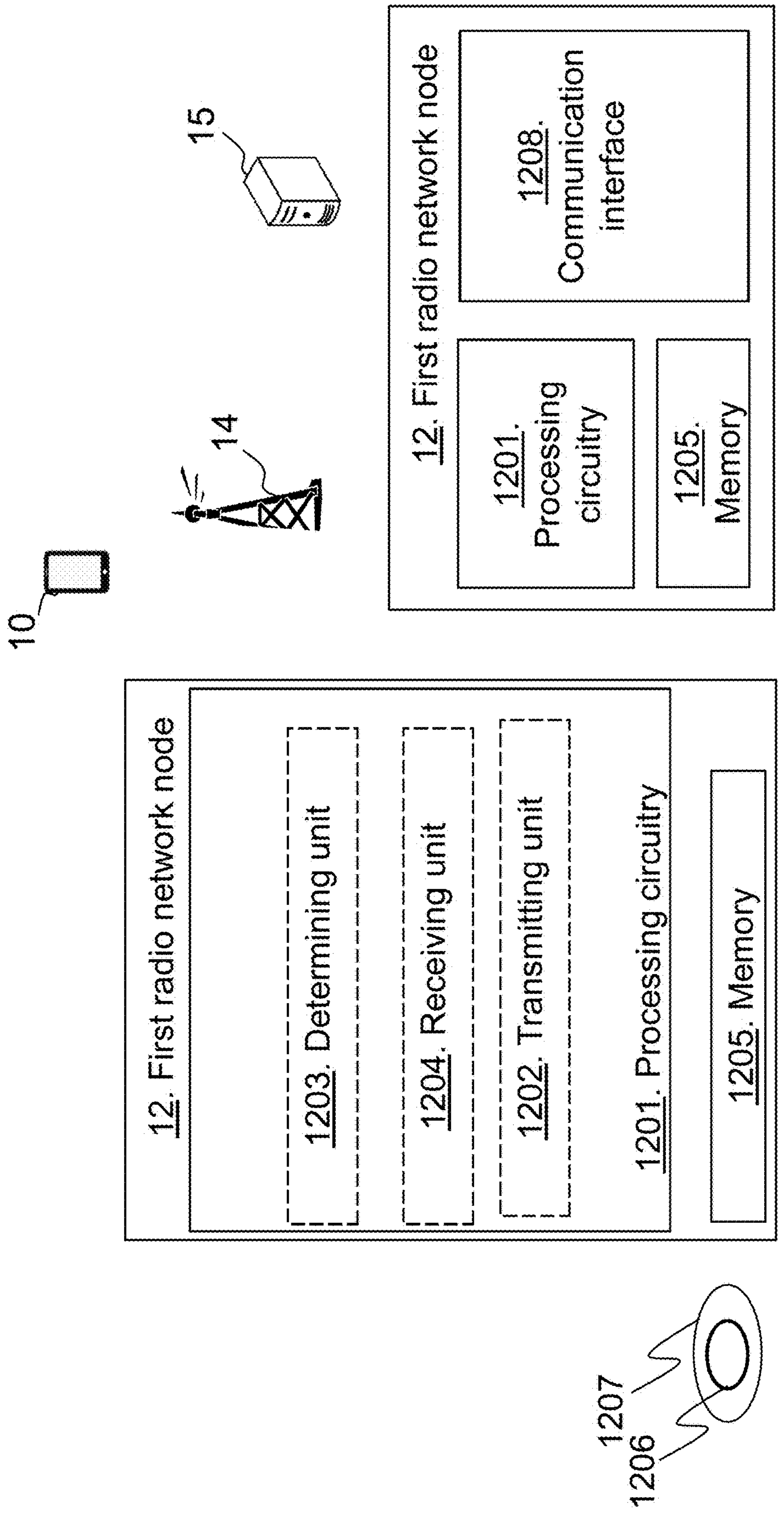
FIG. 12 is a block diagram depicting first radio network nodes according to embodiments herein.

FIG. 12 is a block diagram depicting the first radio network node 12 for handling communication in a wireless communications network 1 according to embodiments herein. The first radio network node 12 may be a source IAB donor CU and the second radio network node 15 may be a target IAB donor CU.

The first radio network node 12 may comprise processing circuitry 1201, e.g. one or more processors, configured to perform the methods herein.

The first radio network node 12 may comprise a transmitting unit 1202, e.g. a transmitter or a transceiver. The first radio network node 12, the processing circuitry 1201, and/or the transmitting unit 1202 may be configured to transmit to the second radio network node, the message related to the handover or the cell reselection of the migrating node to the second radio network node 15. The message may comprise data associated with the migrating node, and data related to the one or more other nodes, directly and indirectly served by the migrating node. For example, the first radio network node 12, the processing circuitry 1201, and/or the transmitting unit 1202 may be configured to transmit to the second radio network node the message for setting up communication, e.g. indicating handover or cell selection, of the node e.g. second intermediate radio network node 14, comprising data. The data may be associated with the (migrating) node e.g. IAB node and related to other nodes, such as IAB nodes and/or UEs, directly and indirectly served by the (migrating) node. The data indicates one or more resources required to serve the node/other nodes. The transmitted message may comprise a HANDOVER REQUEST message.

The first radio network node 12 may comprise a determining unit 1203. The first radio network node 12, the processing circuitry 1201, and/or the determining unit 1203 may be configured to determine to handover the node to the second radio network node. E.g. based on measurements, load conditions or be configured.

The first radio network node 12 may comprise a receiving unit 1204, e.g. a receiver or a transceiver. The first radio network node 12, the processing circuitry 1201, and/or the receiving unit 1204 is configured to receive from the second radio network node 15, the indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node 15. Thus, may be configured to receive the indication indicating whether handover is confirmed or not from the second radio network node 15 for one or more nodes. The first radio network node 12, the processing circuitry 1201, and/or the receiving unit 1204 may be configured to receive the indication indicating whether handover is confirmed or not from the second radio network node 15. The indication may indicate one or more nodes accepted or cancelled for HO to the second radio network node 15. The indication may be comprised in a HANDOVER REQUEST ACKNOWLEDGE message.

The first radio network node 12, the processing circuitry 1201, and/or the determining unit 1203 is configured to determine to cancel handover or cell reselection of the subset of the one or more other nodes based the received indication. E.g. may be configured to determine to cancel handover of one or more nodes out of the plurality of nodes in the message related to handover of cell reselection based on one or more parameters such as the received indication, architecture of nodes (how they are related) and/or signalling measurements associated with the nodes. The first radio network node 12, the processing circuitry 1201, and/or the determining unit 1203 may be configured to determine to cancel handover or cell reselection of the subset of the one or more other nodes further based on one or more parameters. The one or more parameters may comprise: architecture of the one or more other nodes and/or signalling measurements associated with the one or more other nodes. The first radio network node 12, the processing circuitry 1201, and/or the determining unit 1203 may be configured to relocate another subset of the one or more other nodes to the second radio network node based on level of performance at the second radio network node.

The first radio network node 12, the processing circuitry 1201, and/or the transmitting unit 1202 may be configured to transmit the second message to the second radio network node including identities of the determined subset of the one or more other nodes, indicating that the handover of the subset of the one or more other nodes should be cancelled. For example, configured to transmit to the second radio network node another message including identities of the determined subset of UEs and IAB nodes, i.e. the one or more nodes out of the plurality of nodes, indicating that the handover of the indicated nodes should be cancelled. The transmitted second message may comprise a HANDOVER CANCEL message.

The first radio network node 12, the processing circuitry 1201, and/or the transmitting unit 1202 may be configured handle handover process of the migrating node/other nodes based on the received indication.

The first radio network node 12, the processing circuitry 1201, and/or the transmitting unit 1202 may be configured to further initiate an additional handover or cell reselection of the subset of the one or more other nodes. For example, configured to initiate an additional handover or cell change of the determined one or more nodes out of the plurality of nodes.

The first radio network node 12 further comprises a memory 1205. The memory 1205 comprises one or more units to be used to store data on, such as indications, measurements, messages, thresholds, data related to nodes, and applications to perform the methods disclosed herein when being executed, and similar. Furthermore, the first radio network node 12 may comprise a communication interface 1208 such as comprising a transmitter, a receiver and/or a transceiver.

The methods according to the embodiments described herein for the first radio network node 12 are respectively implemented by means of e.g. a computer program product 1206 or a computer program, comprising instructions, i.e., software code portions, which, when executed on at least one processor, cause the at least one processor to carry out the actions described herein, as performed by the first radio network node 12. The computer program product 1206 may be stored on a computer-readable storage medium 1207, e.g. a disc, a universal serial bus (USB) stick or similar. The computer-readable storage medium 1207, having stored thereon the computer program product, may comprise the instructions which, when executed on at least one processor, cause the at least one processor to carry out the actions described herein, as performed by the first radio network node 12. In some embodiments, the computer-readable storage medium may be a transitory or a non-transitory computer-readable storage medium. Thus, embodiments herein may disclose a first radio network node for handling communication in a wireless communications network, wherein the first radio network node comprises processing circuitry and a memory, said memory comprising instructions executable by said processing circuitry whereby said first radio network node is operative to perform any of the methods herein.

Figure 13:
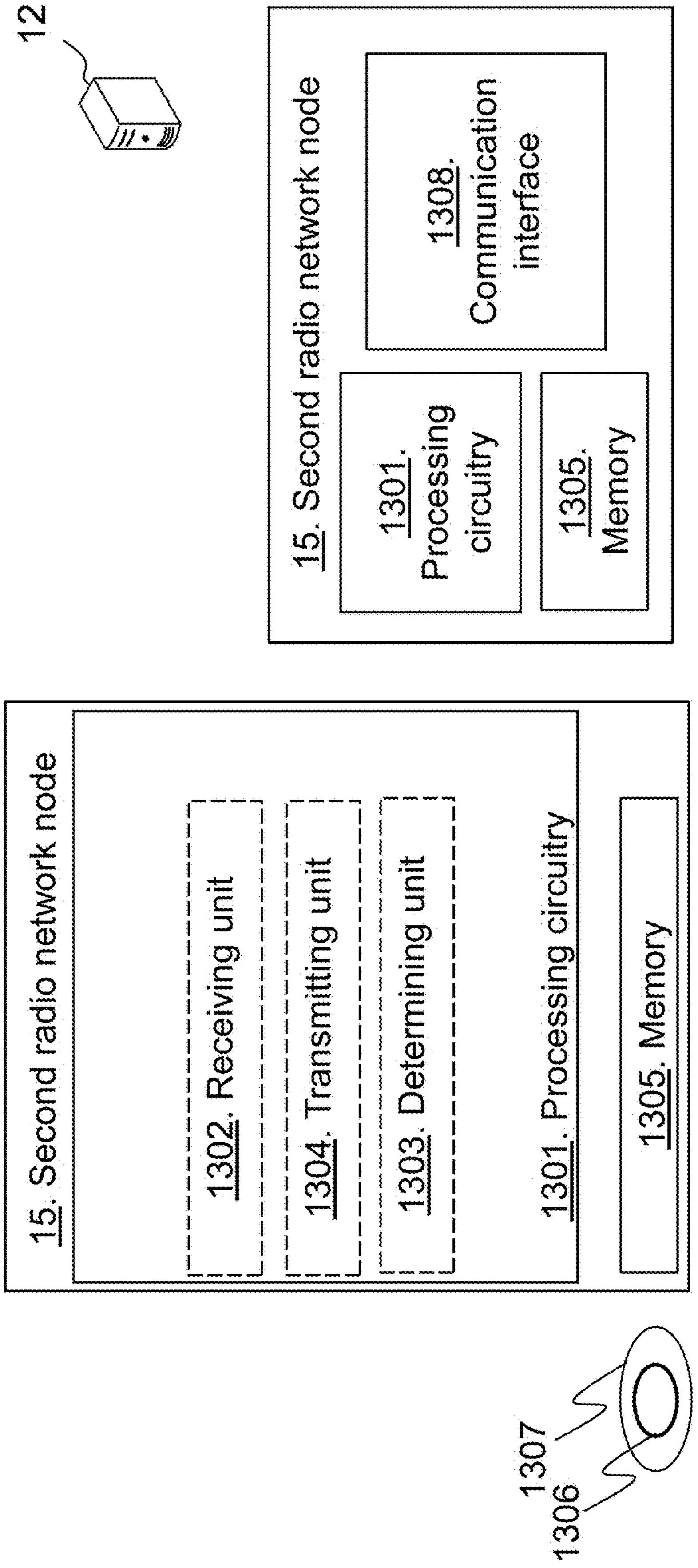
FIG. 13 is a block diagram depicting second radio network nodes according to embodiments herein.

FIG. 13 is a block diagram depicting the second radio network node 15 such as a relay node also denoted as an IAB node, for handling data packets or handling communication in a wireless communications network 1 according to embodiments herein. The wireless communications network may comprise a first radio network node and the second radio network node and one or more nodes relaying data packets between a central network node and a UE. The first radio network node 12 may be a source IAB donor CU and the second radio network node 15 may be a target IAB donor CU.

The second radio network node 15 may comprise processing circuitry 1301, e.g. one or more processors, configured to perform the methods herein.

The second radio network node 15 may comprise a receiving unit 1302, e.g. a receiver or a transceiver. The second radio network node 15, the processing circuitry 1301, and/or the receiving unit 1302 may be configured to receive from the first radio network node, the message related to the handover or the cell reselection of the migrating node to the second radio network node 15, wherein the message comprises data associated with the migrating node, and data related to the one or more other nodes, directly and indirectly served by the migrating node. For example, configured to receive from the first radio network node 12, the message related to handover or cell reselection of a node such as a handover request. The message comprises data (indication) associated with the (migrating) node e.g. IAB node and data related to the node and/or other nodes, such as IAB nodes and/or UEs, directly and/or indirectly served by the node. The data indicates one or more resources required to serve the other nodes. The message received may comprise a HANDOVER REQUEST message.

The second radio network node 15 may comprise a determining unit 1303. The second radio network node 15, the processing circuitry 1301, and/or the determining unit 1303 may be configured to determine or decide whether to allow the handover of the node e.g. performing admission control for the UEs and IAB nodes included in the received data. The second radio network node 15, the processing circuitry 1301, and/or the determining unit 1303 may be configured to perform admission control for the one or more other nodes included in the received message to determine whether to allow the handover or cell reselection of the one or more other nodes.

The second radio network node 15 may comprise a transmitting unit 1304, e.g. a transmitter or a transceiver. The second radio network node 15, the processing circuitry 1301, and/or the transmitting unit 1304 is configured to transmit to the first radio network node 12, the indication indicating whether handover or cell reselection to the second radio network node is confirmed or not, wherein the indication indicates whether the migrating node and/or one or more other nodes, directly and indirectly served by the migrating node, are accepted or cancelled for handover or cell reselection to the second radio network node 15. For example, configured to transmit the indication wherein the indication indicates acceptance or not of handover or cell selection for one or more nodes. The indication may further indicate one or more nodes that has been accepted or not. The indication may be comprised in a HANDOVER REQUEST ACKNOWLEDGE message.

The second radio network node 15, the processing circuitry 1301, and/or the receiving unit 1302 is configured to receive the second message from the first radio network node including identities of the determined subset of nodes of the migrating node and/or the one or more other nodes, indicating that the handover of the indicated subset of nodes should be cancelled. For example, configured to receive another message including identities of a subset of nodes such as UEs and IAB nodes, i.e. the one or more nodes out of a plurality of nodes associated with the indication, and further indicates that the handover of the indicated nodes should be cancelled. The second message may comprise a HANDOVER CANCEL message.

The second radio network node 15, the processing circuitry 1301, and/or the determining unit 1303 may be configured release one or more resources related to the subset of the one or more other nodes.

The second radio network node 15 further comprises a memory 1305. The memory 1305 comprises one or more units to be used to store data on, such as indications, data regarding nodes, messages, capacity, allowed nodes, and applications to perform the methods disclosed herein when being executed, and similar. Furthermore, the second radio network node 15 may comprise a communication interface 1308 such as comprising a transmitter, a receiver and/or a transceiver, with one or more antennas.

The methods according to the embodiments described herein for the second radio network node 15 are respectively implemented by means of e.g. a computer program product 1306 or a computer program, comprising instructions, i.e., software code portions, which, when executed on at least one processor, cause the at least one processor to carry out the actions described herein, as performed by the second radio network node 15. The computer program product 1306 may be stored on a computer-readable storage medium 1307, e.g. a disc, a universal serial bus (USB) stick or similar. The computer-readable storage medium 1307, having stored thereon the computer program product, may comprise the instructions which, when executed on at least one processor, cause the at least one processor to carry out the actions described herein, as performed by the second radio network node 15. In some embodiments, the computer-readable storage medium may be a transitory or a non-transitory computer-readable storage medium. Thus, embodiments herein may disclose a second radio network node for handling communication in a wireless communications network, wherein the radio network node comprises processing circuitry and a memory, said memory comprising instructions executable by said processing circuitry whereby said second radio network node 15 is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are IoT capable device, target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

OTT

Figure 14:
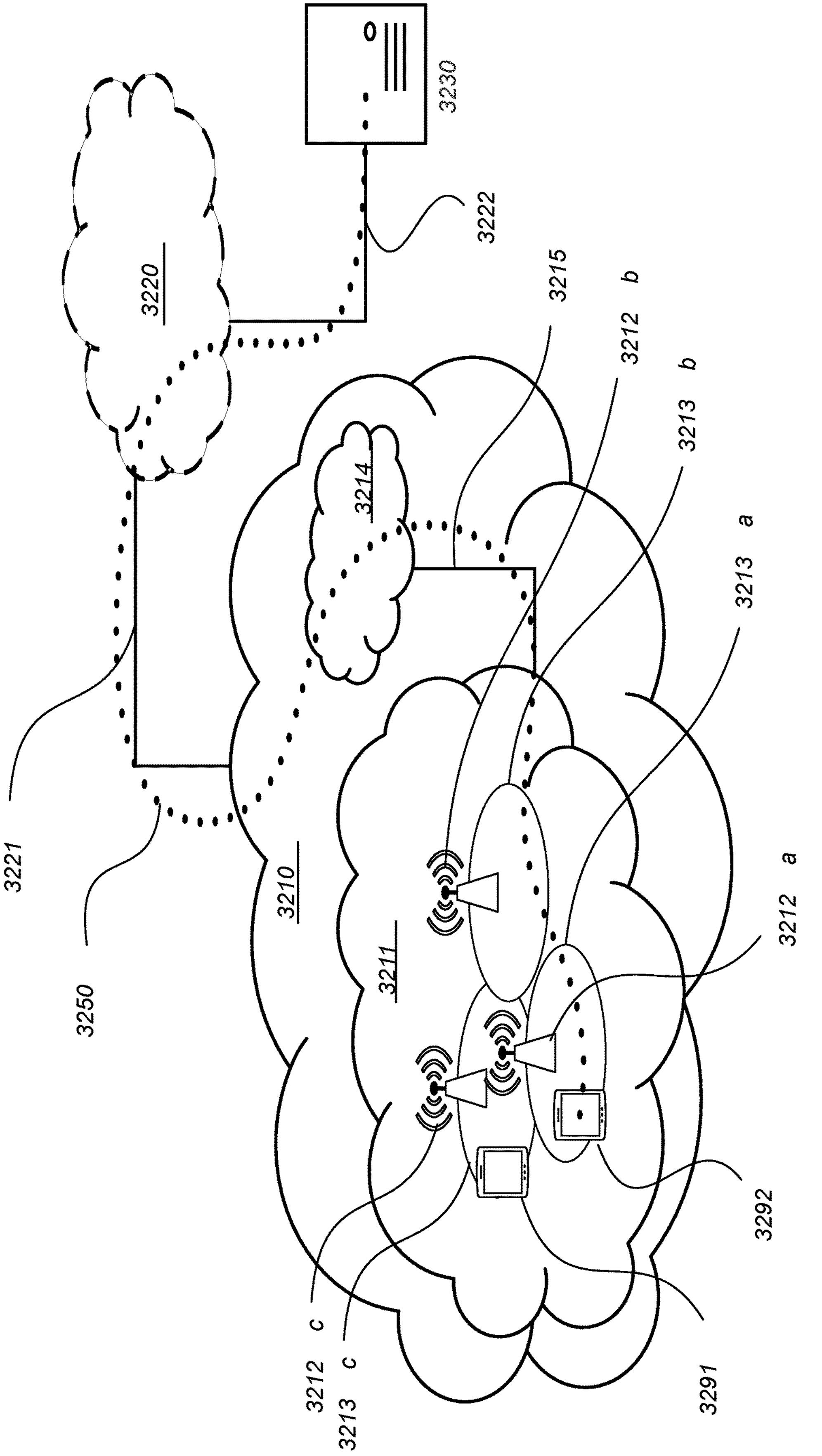
FIG. 14 is a telecommunication network connected via an intermediate network to a host computer in accordance with some embodiments.

FIG. 14 shows a Telecommunication network connected via an intermediate network to a host computer in accordance with some embodiments. With reference to FIG. 14, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 15:
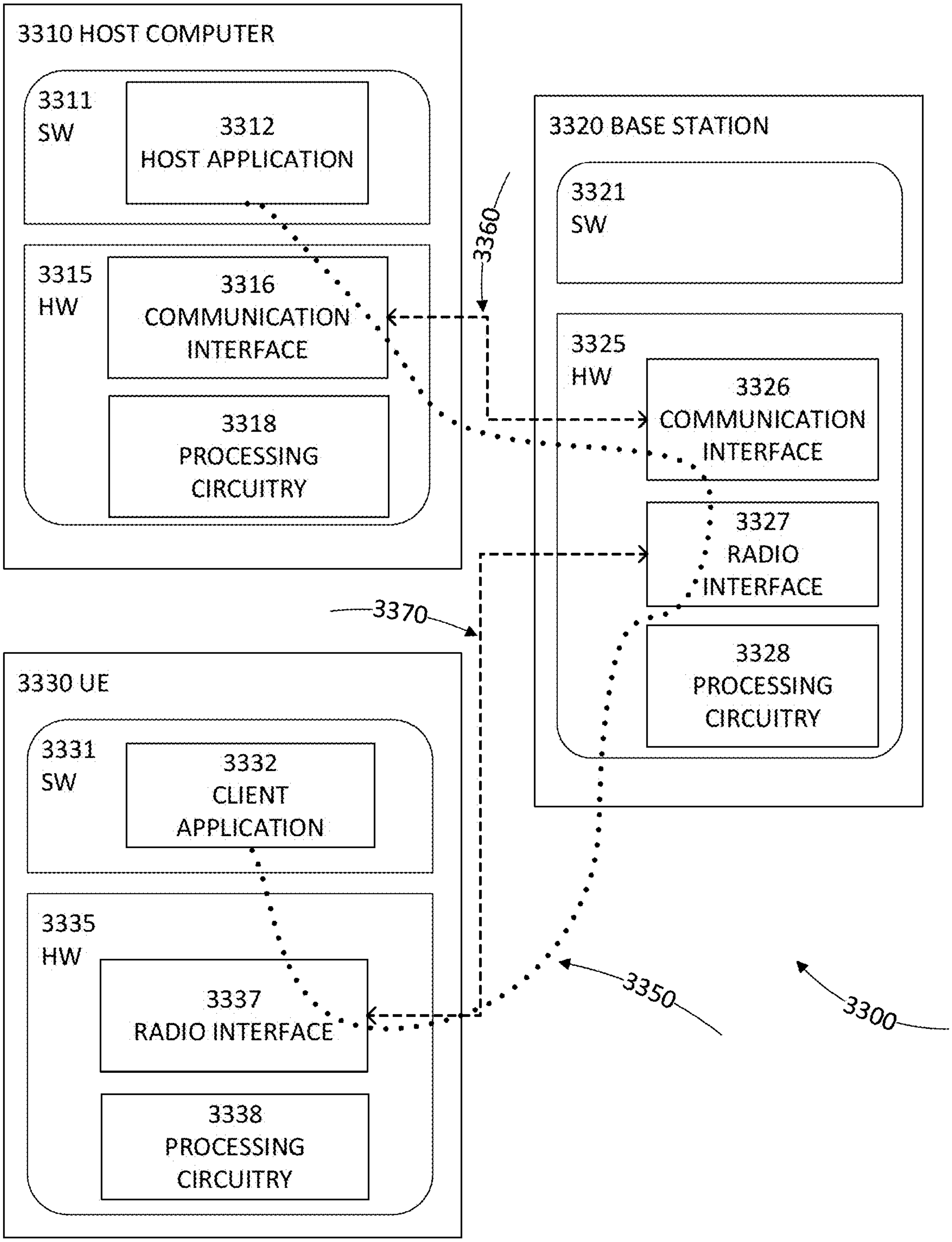
FIG. 15 is a host computer communicating via a base station with a user equipment over a partially wireless connection in accordance with some embodiments.

FIG. 15 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE

3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 15 may be similar or identical to host computer 3230, one of base stations 3212*a*, 3212*b*, 3212*c* and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to enable cancellation of handover of a subset of IAB nodes. Thereby the data communication, e.g. the handling or managing setup of communication may be performed in an efficient manner.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 16:
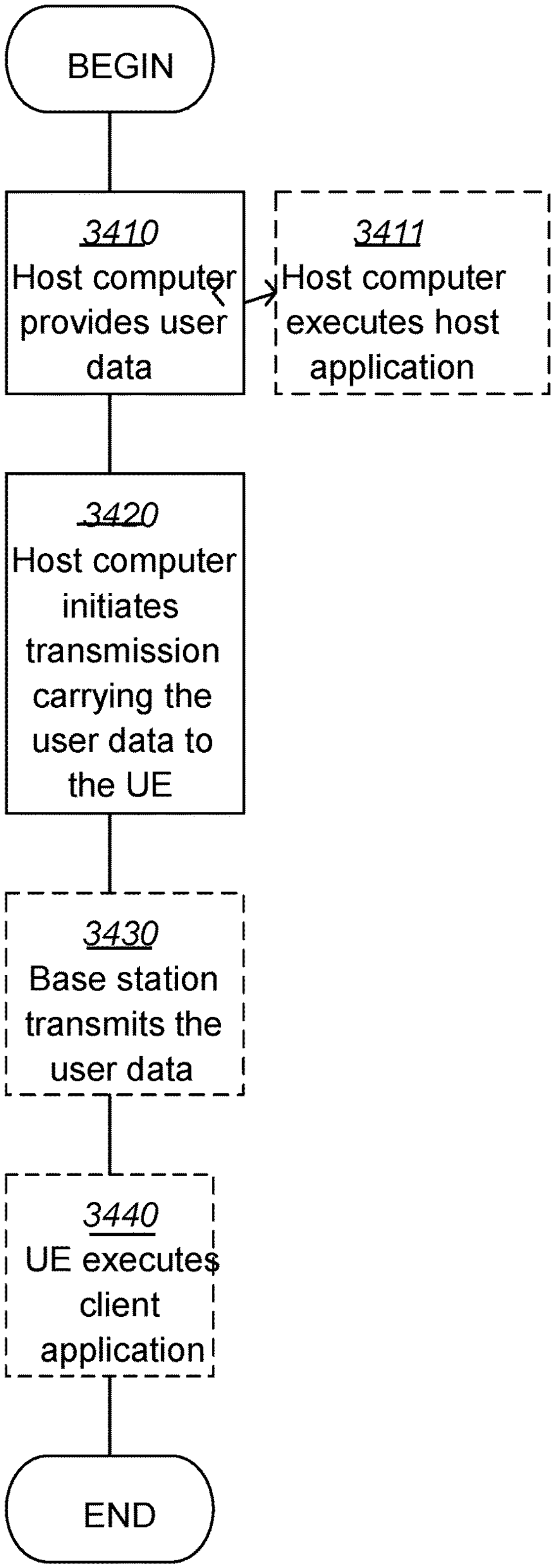
FIG. 16 is methods implemented in a communication system including a host computer, a base station and a user equipment in accordance with some embodiments.

FIG. 16 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 17:
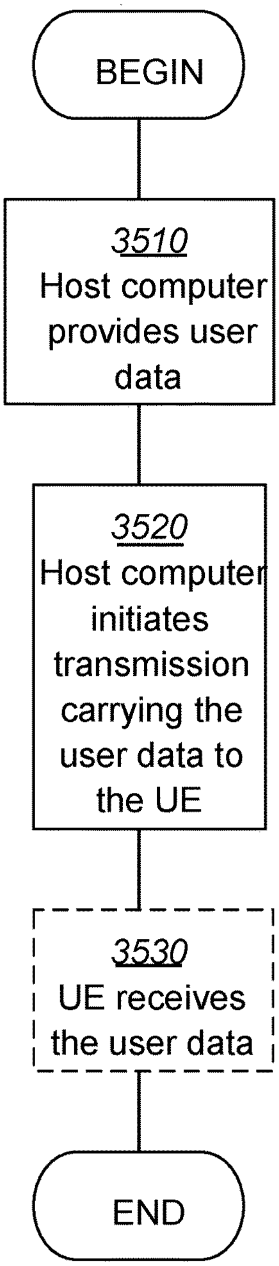
FIG. 17 is methods implemented in a communication system including a host computer, a base station and a user equipment in accordance with some embodiments.

FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 18:
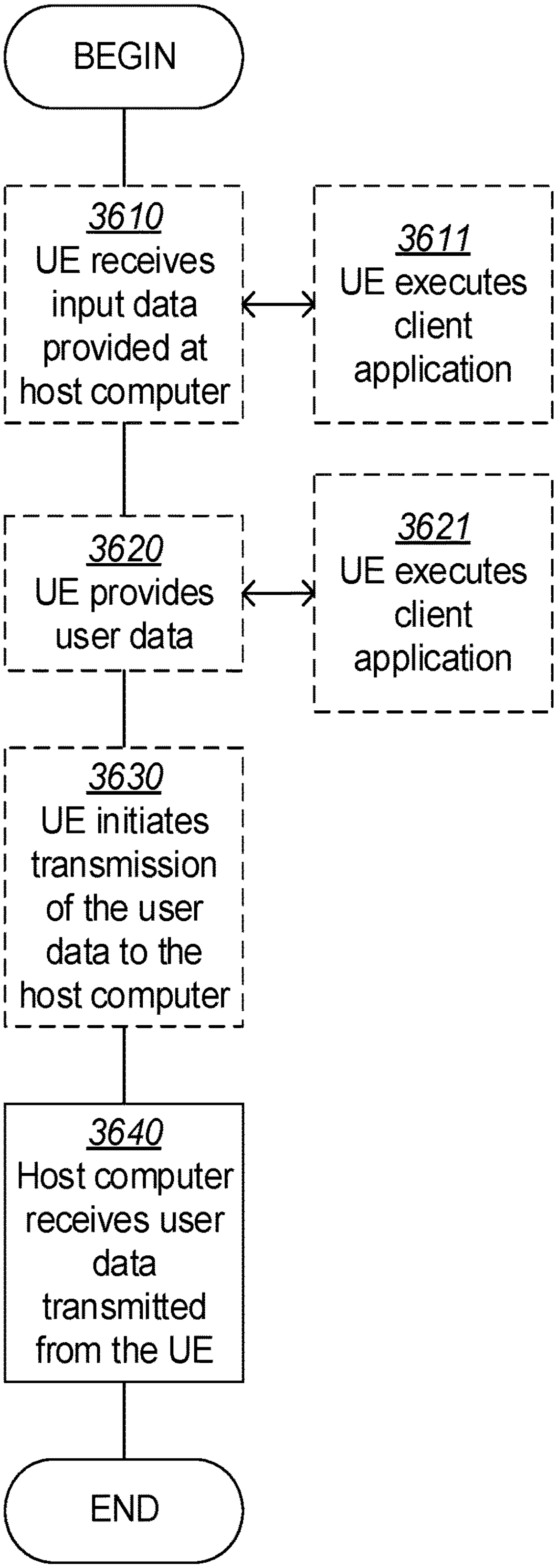
FIG. 18 is methods implemented in a communication system including a host computer, a base station and a user equipment in accordance with some embodiments.

FIG. 18 shows methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 19:
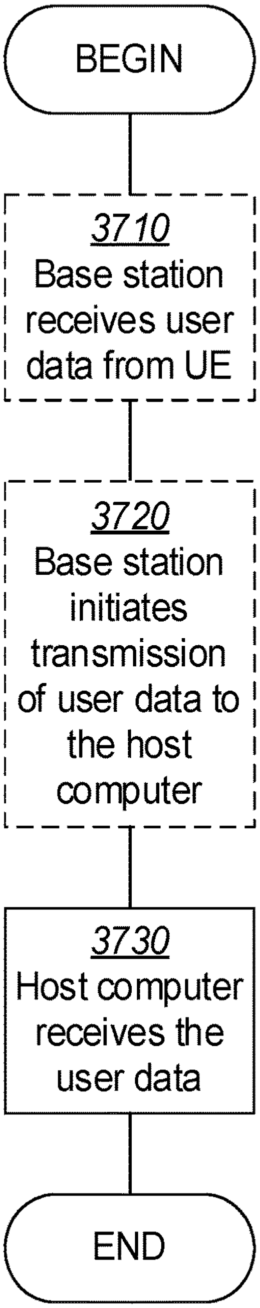
FIG. 19 is methods implemented in a communication system including a host computer, a base station and a user equipment in accordance with some embodiments.

FIG. 19 show methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIG. 14 and FIG. 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

| Abbreviation | Explanation |
|---|---|
| ACK | (positive) Acknowledgment |
| AUL | Autonomous uplink |
| BLER | Block error rate |
| BWP | Bandwidth Part |
| CAPC | Channel access priority class |
| CBG | Code block group |
| CCA | Clear channel assessment |
| CO | Channel occupancy |
| COT | Channel occupancy time |
| CWS | Contention window size |
| DL | Downlink |
| ED | Energy detection |
| eNB | 4G base station |
| gNB | 5G base station |
| HARQ | Hybrid automatic repeat request |
| IS | In synch |
| LAA | Licensed assisted access |
| LBT | Listen before talk |
| MAC | Medium access control |
| MCOT | Maximum channel occupancy time |
| NACK | Negative acknowledgment |
| NDI | New data indicator |
| NR | 3GPP defined 5G radio access technology |
| NR-U | NR unlicensed |
| OOS | out of synch |
| PCell | Primary cell |
| PCI | Physical cell identity |
| PDCCH | A downlink control channel |
| PDU | Protocol data unit |
| PHICH | Physical channel Hybrid ARQ Indicator Channel |
| PLMN | Public land mobile network |
| PSCell | Primary SCG cell |
| PUCCH | Physical Uplink Control Channel |
| PUSCH | Physical Uplink Shared Channel |
| QCI | QoS class identifier |
| QoS | Quality of service |
| RAT | Radio access technology |
| RLF | Radio link failure |
| RLM | Radio link monitoring |
| RLC | Radio link control |
| RRC | Radio resource control |
| RS | Reference signal |
| SCG | Secondary cell group |
| SDU | Service data unit |
| SMTC | SSB—based measurement timing configuration |
| SpCell | Special cell (PCell or PSCell) |
| SPS | Semi persistent scheduling |
| TTI | Transmission time interval |
| UCI | Uplink Control Information |
| UE | User equipment |
| UL | Uplink |

The invention claimed is:

1. A method performed by a first radio network node for handling communication in a wireless communications network, the method comprising:

receiving, from a second radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node; and based on the received indication, determining to cancel handover or cell reselection of a subset of the one or more other nodes based the received indication and relocating another subset of the one or more other nodes to the second radio network node based on level of performance at the second radio network node.

2. The method of claim 1, further comprising transmitting, to the second radio network node, a message related to the handover or the cell reselection of the migrating node to the second radio network node, wherein the message comprises data associated with the migrating node and data related to the one or more other nodes directly and indirectly served by the migrating node.

3. The method of claim 1, wherein determining to cancel handover or cell reselection of the subset of the one or more other nodes is further based on one or more parameters.

4. The method of claim 3, wherein the one or more parameters comprise: architecture of the one or more other nodes and/or signalling measurements associated with the one or more other nodes.

5. The method of claim 1, further comprising transmitting a second message to the second radio network node, the second message including identities of the determined subset of the one or more other nodes, indicating that the handover of the subset of the one or more other nodes should be cancelled.

6. The method of claim 5, wherein the received indication is comprised in a HANDOVER REQUEST ACKNOWLEDGE message and the transmitted message comprises a HANDOVER REQUEST message and the transmitted second message comprises a HANDOVER CANCEL message.

7. The method of claim 5, further comprising initiating an additional handover or cell reselection of the subset of the one or more other nodes.

8. A method performed by a second radio network node for handling communication in a wireless communications network, the method comprising:

transmitting, to a first radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node; and receiving a second message from the first radio network node, the second message including identities of a determined subset of nodes of the migrating node and/or the one or more other nodes, indicating that the handover of the indicated subset of nodes should be canceled.

9. The method of claim 8, further comprising receiving, from the first radio network node, a first message related to the handover or the cell reselection of the migrating node to the second radio network node, wherein the first message comprises data associated with the migrating node, and data related to the one or more other nodes, directly and indirectly served by the migrating node.

10. The method of claim 9, wherein the indication is comprised in a HANDOVER REQUEST ACKNOWLEDGE message and the first message comprises a HANDOVER REQUEST message and the second message comprises a HANDOVER CANCEL message.

11. The method of claim 9, further comprising performing admission control for the one or more other nodes included in the first message to determine whether to allow the handover or cell reselection of the one or more other nodes.

12. The method of claim 11, further comprising releasing one or more resources related to the subset of one or more other nodes.

13. A first radio network node for handling communication in a wireless communications network, wherein the first radio network node comprises interface circuitry and processing circuitry operatively coupled to the interface circuitry, and wherein the interface circuitry and processing circuitry are configured to:

receive from a second radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node; and based on the received indication, determine to cancel handover or cell reselection of a subset of the one or more other nodes and relocate another subset of the one or more other nodes to the second radio network node based on level of performance at the second radio network node.

14. The first radio network node of claim 13, wherein the interface circuitry and processing circuitry are further configured to transmit, to the second radio network node, a message related to the handover or the cell reselection of the migrating node to the second radio network node, wherein the message comprises data associated with the migrating node, and data related to the one or more other nodes, directly and indirectly served by the migrating node.

15. A second radio network node for handling communication in a wireless communications network, wherein the second radio network node comprises interface circuitry and processing circuitry operatively coupled to the interface circuitry, and wherein the interface circuitry and processing circuitry are configured to:

transmit to a first radio network node, an indication indicating whether handover or cell reselection to the second radio network node is confirmed or not, wherein the indication indicates whether a migrating node and/or one or more other nodes, directly and indirectly served by the migrating node, are accepted or cancelled for handover or cell reselection to the second radio network node; and receive a message from the first radio network node, the message including identities of a determined subset of nodes of the migrating node and/or the one or more other nodes, indicating that the handover of the indicated subset of nodes should be canceled.

16. The second radio network node of claim 15, wherein the interface circuitry and processing circuitry are further configured to receive, from the first radio network node, a message related to the handover or the cell reselection of the migrating node to the second radio network node, wherein the message comprises data associated with the migrating node, and data related to the one or more other nodes, directly and indirectly served by the migrating node.

* * * * *